United States Patent
Mikami et al.

(10) Patent No.: US 6,655,133 B2
(45) Date of Patent: Dec. 2, 2003

(54) EXHAUST GAS PURIFIER FOR INTERNAL COMBUSTION ENGINE

(75) Inventors: Akira Mikami, Susono (JP); Shinya Hirota, Susono (JP); Kazuhiro Itoh, Mishima (JP); Takamitsu Asanuma, Susono (JP); Koichi Kimura, Susono (JP); Shunsuke Toshioka, Numazu (JP); Koichiro Nakatani, Susono (JP); Toshiaki Tanaka, Numazu (JP); Masato Gotoh, Mishima (JP); Takekazu Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/106,239

(22) Filed: Mar. 27, 2002

(65) Prior Publication Data

US 2002/0152746 A1 Oct. 24, 2002

(30) Foreign Application Priority Data

Mar. 29, 2001 (JP) .................................... 2001-096770
Jan. 30, 2002 (JP) .................................... 2002-022164

(51) Int. Cl.[7] ............................................. F01N 3/00
(52) U.S. Cl. ............................. 60/296; 60/297; 60/311; 60/324
(58) Field of Search .................. 60/300, 303, 311, 60/296, 288, 297, 287, 301, 324; 422/173, 198; 55/DIG. 30

(56) References Cited

U.S. PATENT DOCUMENTS

| | | | | |
|---|---|---|---|---|
| 2,946,651 A | * | 7/1960 | Houdry ........................ 423/212 |
| 4,386,497 A | * | 6/1983 | Takagi et al. .................. 60/296 |
| 4,462,379 A | * | 7/1984 | Tsuge et al. ................... 60/278 |
| 4,515,758 A | * | 5/1985 | Domesle et al. ............ 423/213.2 |
| 4,535,588 A | * | 8/1985 | Sato et al. ..................... 60/286 |
| 4,562,695 A | * | 1/1986 | Rao et al. ...................... 60/286 |
| 4,923,487 A | * | 5/1990 | Bogart et al. .................. 55/482 |
| 5,067,319 A | | 11/1991 | Moser |
| 5,768,888 A | * | 6/1998 | Matros et al. .................. 60/274 |
| 5,974,791 A | * | 11/1999 | Hirota et al. ................... 60/276 |
| 6,013,118 A | * | 1/2000 | Matsunuma et al. ........ 55/282.3 |
| 6,023,930 A | * | 2/2000 | Abe et al. ...................... 60/311 |
| 6,167,696 B1 | * | 1/2001 | Maaseidvaag et al. ......... 60/274 |
| 6,293,096 B1 | * | 9/2001 | Khair et al. ................... 60/286 |
| 6,314,722 B1 | * | 11/2001 | Matros et al. .................. 60/274 |
| 6,367,246 B1 | * | 4/2002 | Hirota et al. ................... 60/295 |

FOREIGN PATENT DOCUMENTS

| | | |
|---|---|---|
| EP | 0 984 142 A1 | 3/2000 |
| JP | 57-065812 * | 4/1982 |
| JP | 05-098932 | 4/1993 |
| JP | A 6-159037 | 6/1994 |
| JP | A 7-189656 | 7/1995 |
| JP | 09-094434 | 4/1997 |
| JP | 2001-082128 | 3/2001 |
| WO | WO 02/08580 A1 | 1/2002 |

OTHER PUBLICATIONS

U.S. patent application Ser. No. 09/958,597, Itoh et al., filed Oct. 11, 2001.
U.S. patent application Ser. No. 09/904,875, Asanuma et al., filed Jul. 16, 2001.

* cited by examiner

Primary Examiner—Binh Tran
Assistant Examiner—Diem Tran
(74) Attorney, Agent, or Firm—Oliff & Berridge, PLC

(57) ABSTRACT

An exhaust gas purifier includes a particulate filter for oxidizing collected particulates, a reversing device that reverses an exhaust gas upstream side and an exhaust gas downstream side of the particulate filter. The particulate filter includes a collecting wall for collecting the particulates, which includes a first collecting surface and a second collecting surface. The first and the second collecting surfaces are alternately used for collecting the particulates by the reversing device. The catalyst device is arranged adjacent to the particulate filter at a position always being at the downstream side of the particulate filter.

22 Claims, 27 Drawing Sheets

FIG. 8
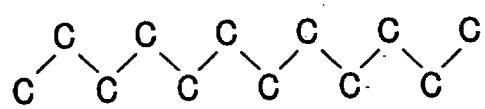
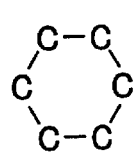 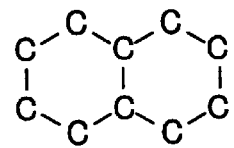
FIG. 9
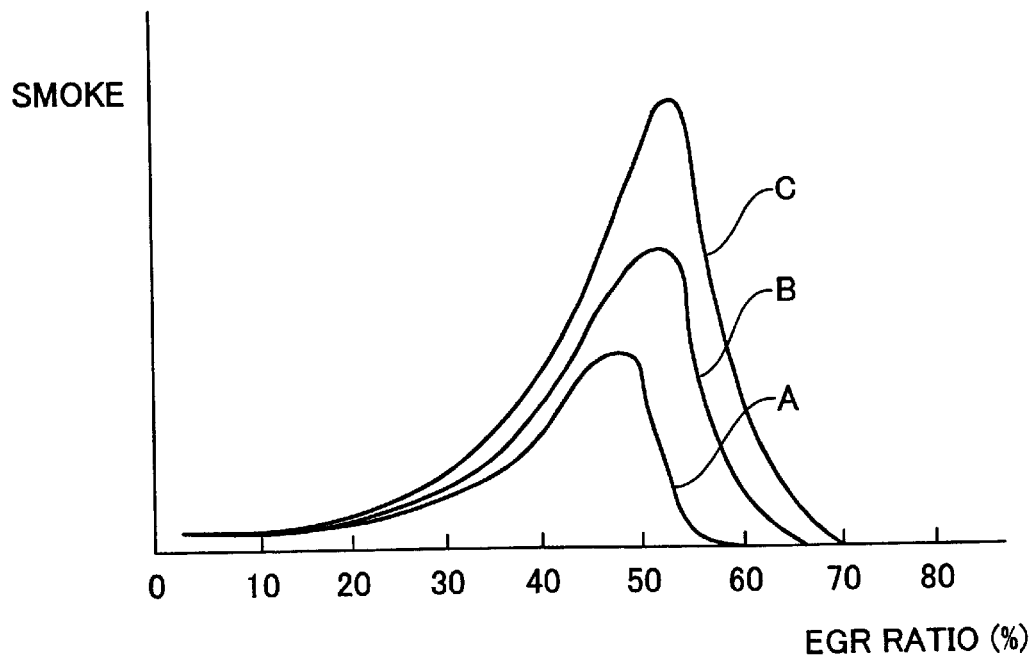

FIG. 27A
FLOW OF EXHAUST GAS
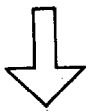
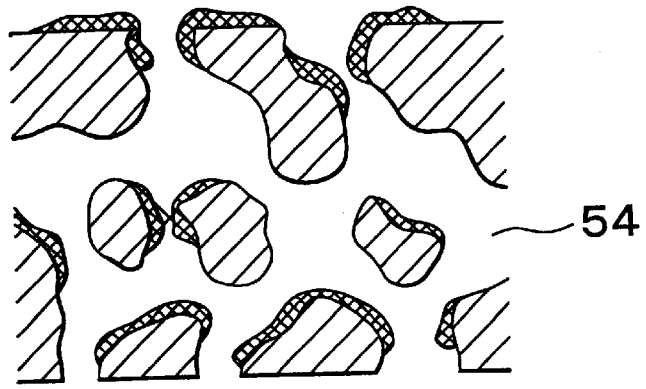
~54
FIG. 27B
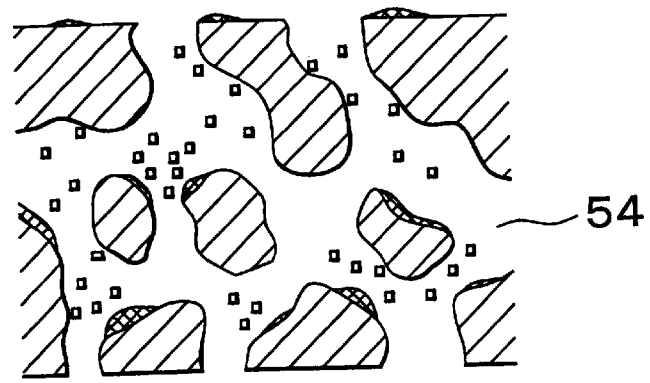
~54
FLOW OF EXHAUST GAS

EXHAUST GAS PURIFIER FOR INTERNAL COMBUSTION ENGINE

INCORPORATION BY REFERENCE

The disclosures of Japanese patent Application Nos. 2001-96770 filed on Mar. 29, 2002 and 2002-22164 filed on Jan. 30, 2002, including the specifications, drawings and abstracts are incorporated herein by reference in their entirety.

BACKGROUND OF THE INVENTION

1. Field of the Invention

The invention relates to an exhaust gas purifier for internal combustion engine.

2. Description of the Related Art

In the internal combustion engine, particularly in a diesel engine, particulates mainly composed of soot are contained in the exhaust gas. Since such particulates are harmful substance, it is proposed that a particulate filter for collecting the particulates before being discharged to the atmosphere is disposed in an exhaust system of the engine. However, in order to prevent the increase of exhaust gas resistance due to the clogging, the collected particulates should be combusted. In such filtering regeneration, the particulates may be ignited for the combustion at about 600° C., but the exhaust gas temperature of the diesel engine is generally lower than 600° C. and it is necessary for the filter itself to be heated.

According to Japanese Patent Application Laid-open No. 7-106290, it is disclosed that the particulates on the filter are continuously combusted at the temperature of about 400° C. which is the normal temperature of the diesel engine exhaust gas by adding the platinum metal and alkaline-earth metals to the filter. However, even using such filter, it is not certain that the temperature of the exhaust gas is always maintained at 400° C. and depending on the driving condition of the engine, a great amount of the particulates may be discharged from the diesel engine and accumulated gradually on the filter, which are not combusted at each timing.

When the particulates are accumulated to a certain amount on this filter, the combustion capacity for the particulates will be decreased not to regenerate the filter by itself Thus, it is not sufficient to provide simply such filter in the engine exhaust system. This may cause clogging at an early timing and may influence on the output performance of the engine.

SUMMARY OF THE INVENTION

It is an object of the invention to provide an exhaust gas purifier for an internal combustion engine, which can prevent an early clogging of a particulate filter and at the same time can decrease the discharge amount of the harmful substances contained in the exhaust gas to the atmosphere other than the particulates.

According to a first aspect of the invention, the exhaust gas purifier for the internal combustion engine includes a particulate filter disposed in the engine exhaust system for collecting the particulates and a reversing device that reverses an exhaust gas upstream side and an exhaust gas downstream side of the particulate filter. The collected particulates by the filter are oxidized and the filter includes a collecting wall for collecting the particulates. The collecting wall includes first and second collecting surfaces, which are alternately used for collecting the particulates by reversing the exhaust gas upstream side and downstream side of the filter by the reversing device. A catalyst device is provided adjacent to the particulate filter at the position of always keeping downstream side of the filter.

Some particulates may be left on the first collecting surface of the particulate filter collecting wall due to insufficient oxidization according to the driving condition. However, according to the first aspect of the exhaust gas purifier for the internal combustion engine, the reversing of the exhaust gas upstream side and downstream side by the reversing device will not let the particulates be accumulated on the first collecting surface of the collecting wall and a gradual oxidization removal of the particulates is possible. At the same time, by the second collecting surface of the collecting wall, the collection and oxidization of the particulates begin. By alternate using of the first and second collecting surfaces for particulates collection, the amount of the collected particulates at each collecting surface can be reduced compared to the collection by using a single collecting surface. This will be advantageous in oxidization removal of the particulates to obviate the accumulation of the particulates on the filter to eventually prevent clogging of the filter.

Further, since the catalyst device is provided always at the downstream of the particulate filter adjacent thereto, the catalyst device functions relatively effectively by the temperature increase through the heat conductivity from the particulate filter to reduce a possible large amount discharge of the harmful substances other than the particulates contained in the exhaust gas.

In the first aspect of the invention, the collecting wall may carry an active oxygen release agent to oxidize the particulates by active oxygen released from the active oxygen release agent.

In the above aspect, the active oxygen release agent captures and retains the surrounding excess oxygen and discharges the collected oxygen in the form of active oxygen when the surrounding oxygen concentration is decreased.

In the first aspect of the invention, the catalyst device can be structured to carry the oxidization catalyst.

In the first aspect of the invention, the catalyst device can be structured to carry the NOx catalyst.

In the first aspect of the invention, the reversing device may include a valve body, and the exhaust gas upstream side and downstream side of the particulate filter may be reversed by changing the position of the valve body from a first position to a second position, and the exhaust gas may flow into the catalyst device without passing through the particulate filter when the valve body is positioned at an intermediate position between the first and second positions.

In the above aspect of the invention, the valve body can be positioned at the intermediate position immediately after the engine starts.

In the above aspect of the invention, the exhaust gas purifier device may include a temperature detecting device that detects or assumes a temperature of the catalyst device, and when the temperature detected or assumed by this temperature detecting device is not within a predetermined temperature range, the valve body may be set to be the intermediate position for changing the exhaust gas condition to control the catalyst device temperature to be within the predetermined range.

In the above aspect of the invention, the exhaust throttle valve may be provided in the engine exhaust gas system, and the position of the valve body may be controlled at the intermediate position immediately before the exhaust throttle valve is opened.

In the above aspect of the invention, when the engine is under deceleration, the valve body may be positioned at the intermediate position, and at the same time the temperature of the exhaust gas may be increased or the deoxidization substances in the exhaust gas may be increased.

In the first aspect of the invention, the reversing device may include a valve body, and may reverse the exhaust gas upstream side and the exhaust gas downstream side of the particulate filter by switching the valve body from a first position to a second position, and the catalyst device may be arranged adjacent to a downstream of the valve body.

In the first aspect of the invention, the catalyst device may be arranged closer to the internal combustion engine than the particulate filter, and the catalyst device may be connected to the particulate filter so that the exhaust gas that flows out the particulate filter flows into the catalyst device.

In the first aspect of the invention, the catalyst device may include a partition wall formed by porous material and divides the inside of the catalyst device into a plurality of axial spaces, and a flow amount control portion that is arranged at at least one of an upstream end and an downstream end of the axial space and controls a flow amount of the exhaust gas.

In the above aspect of the invention, the flow amount control portion may be arranged at the upstream end or the downstream end of the partition wall which surrounds one of two adjacent axial spaces.

In the above aspect of the invention, the flow amount control portion may be a plug which is arranged at one of the upstream side and the downstream side of each axial apace and prevents the exhaust gas from flowing.

In the above aspect of the invention, the flow amount control portion may be a tapered portion which enlarges or reduces an opening area of the axial space.

In the above aspect of the invention, the tapered portion may be provided with a passage which has a cross section area smaller than a cross section area of the axial space.

In the above aspect of the invention, the tapered portion may be formed by deformation of the partition wall.

In the above aspect of the invention, the flow amount control portion may be a catalyst coating layer that carries a catalyst on the partition wall.

In the first aspect of the invention, both of the particulate filter and the catalyst device may be arranged in a housing.

In the first aspect of the invention, the catalyst device may be positioned around the particulate filter.

BRIEF DESCRIPTION OF THE DRAWINGS

FIG. 6 shows a generated amount of smoke, a generated amount of NOx, and so on;

FIG. 8 shows fuel molecules;

FIG. 9 shows a relation between the smoke generation amount and EGR ratio;

FIG. 13 shows a throttle opening degree of the throttle valve and so on;

FIG. 27A and FIG. 27B are enlarged views of the partition wall of the particulate filter;

DETAILED DESCRIPTION OF THE PREFERRED EMBODIMENTS

In the following description and the accompanying drawings, the invention will be described in more detail in terms of specific embodiments.

Figure 1:
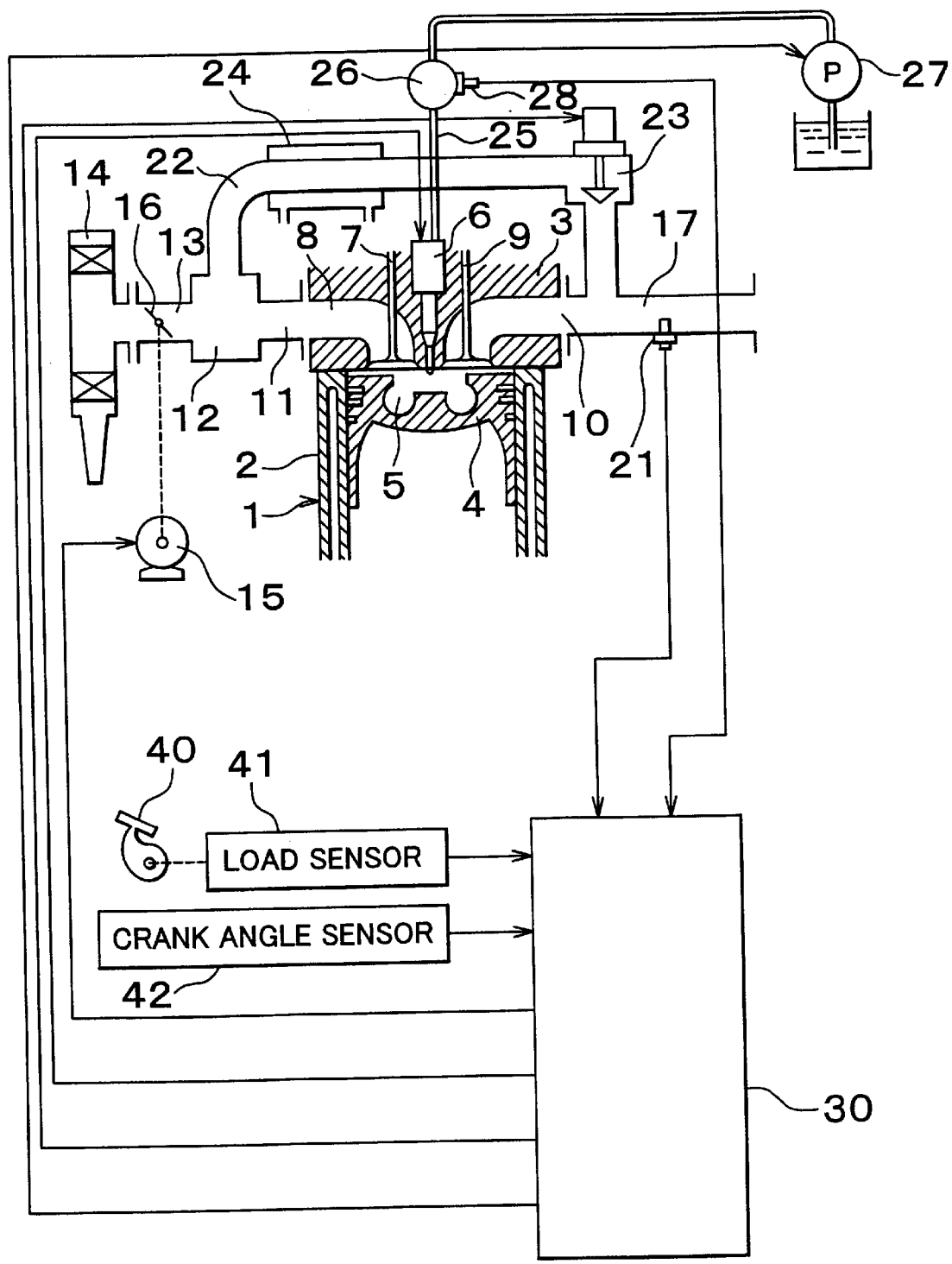
FIG. 1 is a cross sectional view of a diesel engine employed with an exhaust gas purifier according to an embodiment of the invention.
Figure 2:
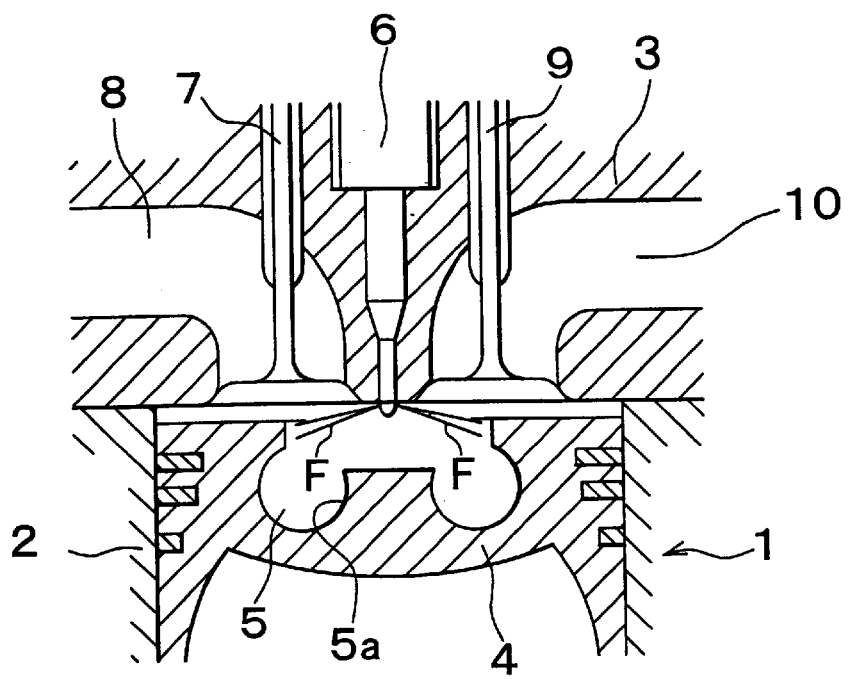
FIG. 2 is an enlarged cross sectional view of a combustion chamber in FIG. 1.
Figure 3:
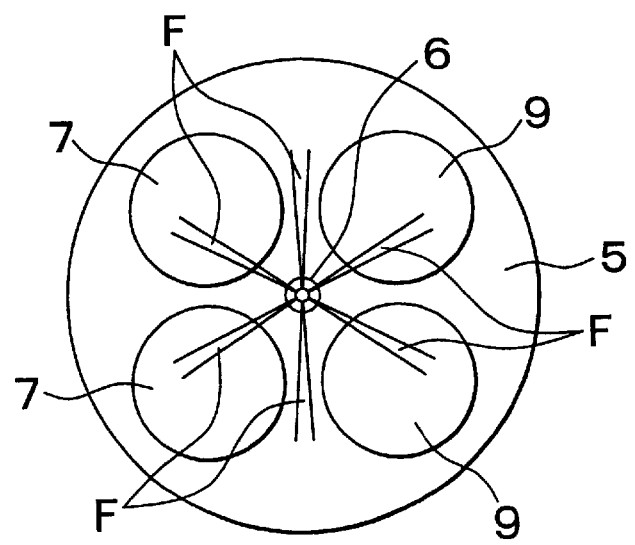
FIG. 3 is a bottom side view of the cylinder head.

FIG. 1 shows an exhaust gas purifier employed in a four-stroke type diesel engine according to the embodiment of the invention. FIG. 2 is an enlarged sectional view of a combustion chamber of the diesel engine in FIG. 1. FIG. 3 is a bottom view of the cylinder head of the diesel engine in FIG. 1. FIG. 1 and FIG. 2 show an engine 1, a cylinder block 2, a cylinder head 3, a piston 4, a cavity 5a, a combustion chamber 5 in the cavity 5a, an electronic fuel injection valve 6, a pair of intake valves 7, an intake port 8, a pair of exhaust valves 9, and an exhaust port 10. As shown in FIG. 1, the intake port 8 is connected to a surge tank 12 through a corresponding intake branch 11. The surge tank 12 is connected to an air cleaner 14 via an intake duct 13. A throttle valve 16 driven by an electric motor 15 is disposed in the intake duct 13. Furthermore, the exhaust port 10 is connected to an exhaust manifold 17.

As is shown in FIG. 1, the exhaust manifold 17 is provided with an air-fuel ratio sensor 21. The exhaust manifold 17 and the surge tank 12 are connected to each other by an EGR passage 22 and the electrically controlled EGR control valve 23 is provided within the EGR passage 22.

Further, a cooling unit 24 for cooling the EGR gas flowing through the EGR passage 22 is disposed around the EGR passage 22. In the embodiment shown in FIG. 1, engine coolant is introduced into the cooling unit 24 and cools EGR gas. On the other hand, each fuel injection valve 6 is connected to a fuel reservoir, namely, a so-called common rail 26 through a fuel supply pipe 25. The common rail 26 is supplied with fuel from an electronic fuel pump 27 whose discharge amount is variable. The fuel that has been supplied to the common rail 26 is supplied to the fuel injection valve 6 through each fuel supply pipe 25. A fuel pressure sensor 28 for detecting the fuel pressure in the common rail 26 is fitted thereto. Based on the output signal from the fuel pressure sensor 28, the discharge amount of the fuel pump 27 is controlled such that the fuel pressure in the common rail 26 becomes equal to a target fuel pressure.

An electronic control unit 30 is inputted an output signal from the air-fuel ratio sensor 21 and an output signal from the fuel pressure sensor 28. A load sensor 41 generating an output voltage proportional to the depression amount L of an accelerator pedal 40 is connected thereto. An output voltage of the load sensor 41 is inputted to the control unit 30. Furthermore, a crank angle sensor 42, which generates an output pulse every time a crankshaft rotates for example by 30° CA, is connected to the control unit 30. Thus the electric control unit 30 operates fuel injection valve 6, electric motor 15, the EGR control valve 23, and the fuel pump 27 based on each output signal.

As shown in FIGS. 2 and 3, the fuel injection valve 6 is formed by a holed nozzle with six nozzle openings and fuel F is injected from the nozzle openings in a lower direction relative to the horizontal direction with an equal interval. As shown in FIG. 3, two fuel sprays F among the six are injected along the underside of the valve body of each exhaust valve 9. FIGS. 2 and 3 show the fuel injection at the end of the compression stage. The fuel sprays F advance toward the internal surface of the cavity 5a and ignited for combustion.

Figure 4:
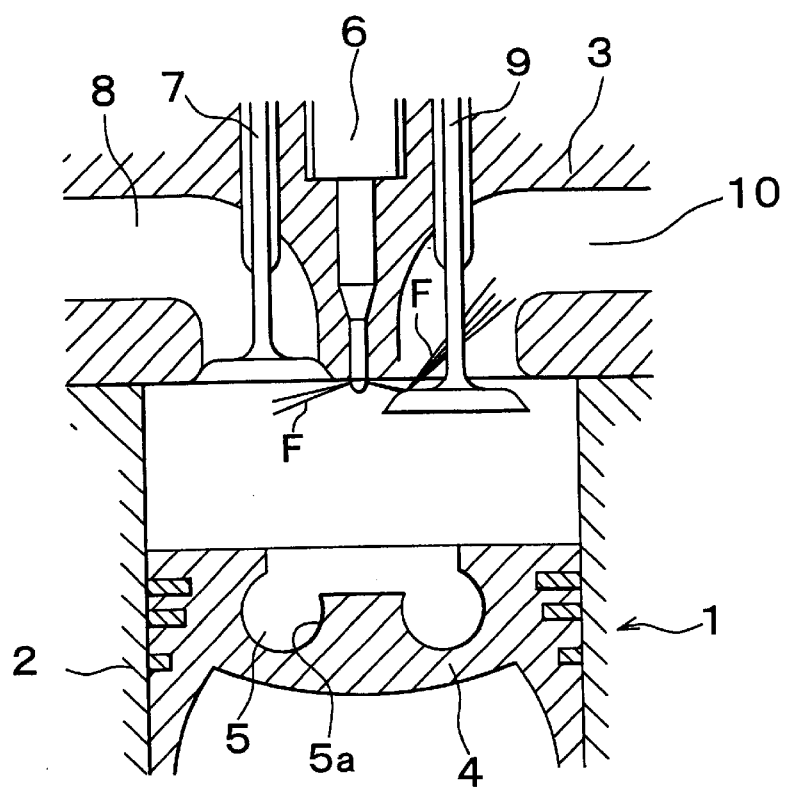
FIG. 4 is a side cross sectional view of the combustion chamber.
Figure 5:
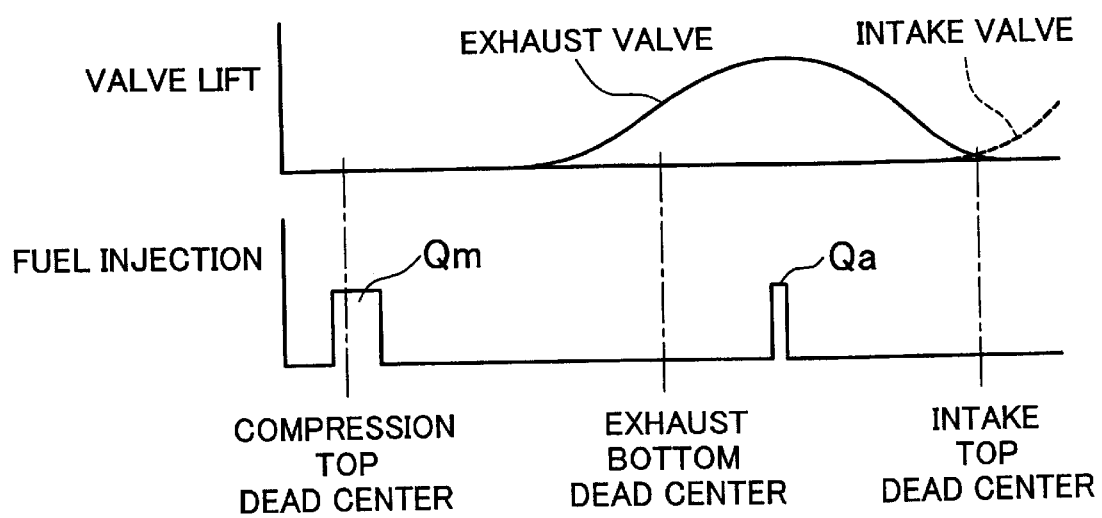
FIG. 5 is a view showing a fuel injection and lifting of intake and exhaust valves.

FIG. 4 shows the additional fuel injection condition from the fuel injection valve 6 at the maximum lifting amount of the exhaust valve 9 during the exhaust stage. In more detail, the main fuel injection Qm is made at the compression top dead center as shown in FIG. 5 and then the additional fuel Qa is injected at the middle of the exhaust stage. The fuel sprays F advancing toward the valve body of the exhaust valve 9 advance toward the position between the back of the umbrella portion of the injection valve 6 and the exhaust port 10. In other words, the two nozzle openings among the six of the fuel injection valves 6 are formed to advance toward the position between the back of the umbrella portion of the injection valve 6 and the exhaust port 10, when the additional fuel Qa is injected during the exhaust valve 9 being opened. In the embodiment shown in FIG. 4, the injected fuel sprays F collide on the back of the umbrella portion of the exhaust valve 9 and collided fuel sprays F reflect on the back of the umbrella portion of the valve 9 to advance toward the exhaust port 10.

Figure 6:
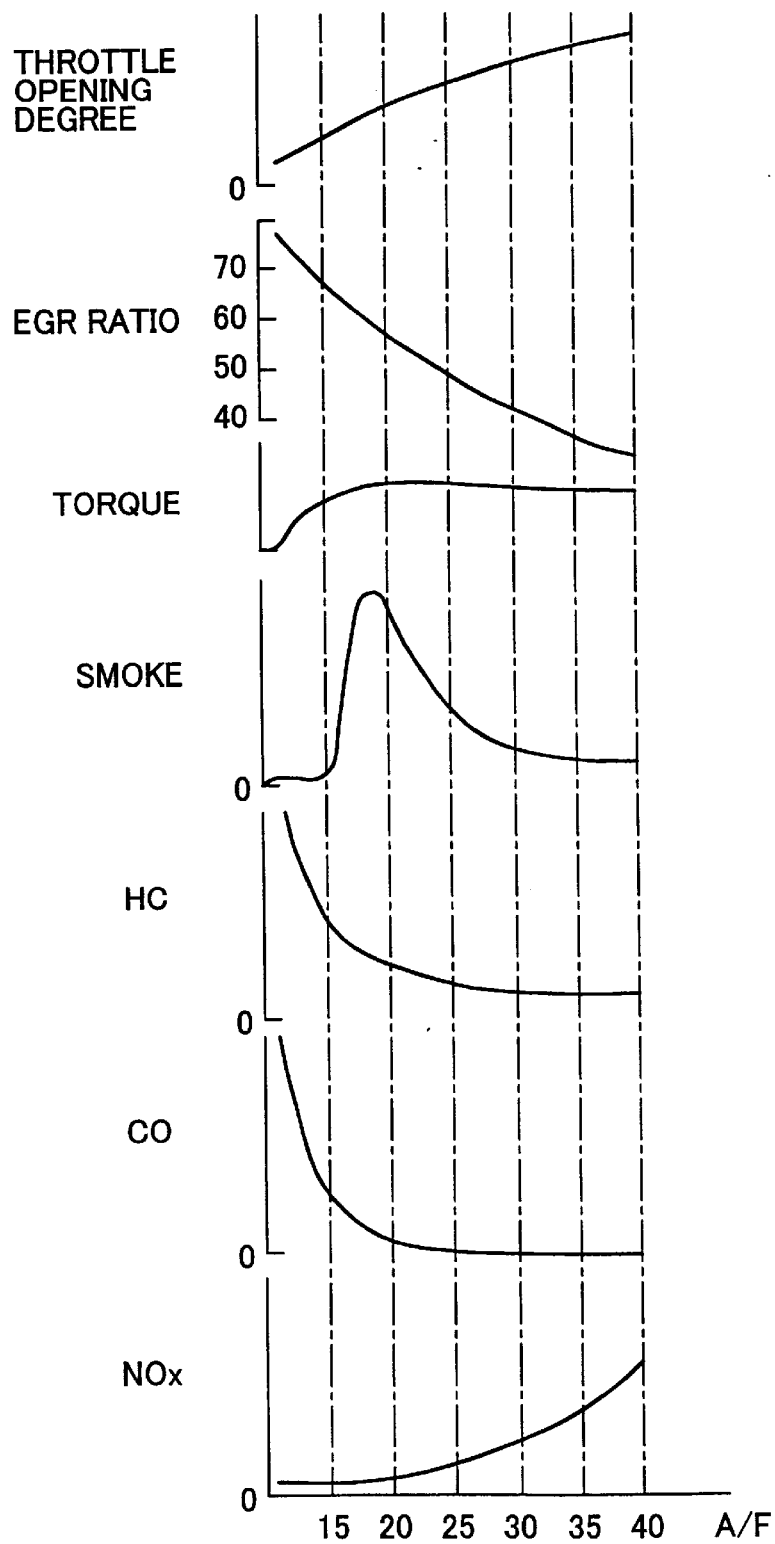

Normally the additional fuel Qa is not injected and only the main fuel injection Qm is injected. FIG. 6 shows an output torque change when the air-fuel ratio A/F (horizontal axis in FIG. 6) is changed by changing throttle opening degree and the EGR ratio during the engine under low load operation and experimental examples of the exhaust amount change of smoke, HC, CO and NOx. As shown in the examples of FIG. 6, the EGR ratio becomes larger when the air-fuel ratio A/F becomes smaller and under the theoretical air-fuel ratio (about 14.6) the EGR ratio becomes 65% or more.

As shown in FIG. 6, by increasing the EGR ratio, when the air-fuel ratio A/F is reduced, the smoke amount begins increase at the EGR ratio being around 40% and air-fuel ratio A/F being 30. When the EGR ratio is further increased and air-fuel ratio A/F is further reduced, the smoke amount suddenly increased to reach the peak. Further increase of the EGR ratio and further deoxidization of the air-fuel ratio A/F lead to sudden decrease of the smoke amount. When the EGR ratio exceeds 65% and the air-fuel ratio A/F becomes about 15.0, the smoke amount becomes almost zero. In other words, very few soot is generated at this point but then HC or CO begins increase instead.

Figure 7A:
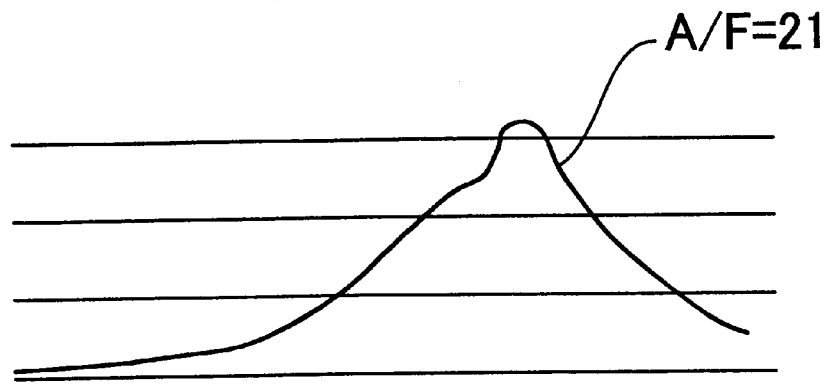
FIG. 7A and FIG. 7B are graphs showing combustion pressure.
Figure 7B:

FIG. 7A shows the combustion pressure change in the combustion chamber 5 at the most increased smoke amount around the air-fuel ratio being 21 and FIG. 7B shows the combustion pressure change in the combustion chamber 5 at substantially zero level smoke amount around the air-fuel ratio being 18. As clearly shown comparing the condition of FIG. 7A with the condition of FIG. 7B, the combustion pressure at the smoke amount of zero shown in FIG. 7B is lower than the condition of large amount of smoke being generated as shown in FIG. 7A.

From the examples of FIGS. 7A and 7B, the following can be said:

First, the air-fuel ratio A/F under 15.0 and the smoke amount of almost zero, the NOx generation is reduced as shown in FIG. 6. This means the combustion temperature in the combustion chamber 5 is lowered and the temperature in the combustion chamber is low when very few soot is generated. This can be said according to the graphs in FIG. 7. When the soot is not generated as shown in FIG. 7B, the combustion pressure is low and accordingly the combustion temperature in the combustion chamber 5 is low.

Secondly, when the smoke, or the soot generation is almost zero, the amount of HC and CO discharged becomes increase. This means that the hydrocarbon HC is discharged before becoming soot. When the liner hydrocarbon and aromatic hydrocarbon contained in the fuel are thermally cracked to form precursor of soot (precursor of soot) when the temperature is increased under the insufficient oxygen condition and then soot is formed composed of mainly solid carbon-collected (solid agglomeration of carbon atoms). The actual process of this formation is complicated and it is not confirmed how the precursor of soot is generated. However, as shown in FIG. 8, hydrocarbon grows to become soot after forming such precursor of soot. As described, when the generation of soot becomes zero, the discharged amount of HC and CO becomes increasing. The HC at this stage may be a precursor of soot or the earlier stage HC discharged from the combustion chamber 5. More research has been conducted and we found the fact that when the temperature of fuel in the combustion chamber and the surrounding gas are lower than a certain temperature, the soot growth stops on the way and no soot is generated and when the temperature becomes a certain level, the soot is generated.

Such certain temperature to form soot or precursor of soot cannot be defined due to the various factors involved such as fuel type or air-fuel ratio and compression ratio, but it deeply relates to the generation of the NOx. Thus the certain temperature can be defined to a certain level from the generation amount of NOx. When the EGR ratio increases, the temperature of fuel or the surrounding gas decreases to reduce the NOx generation amount. When the NOx generation amount is about 10 p.p.m or less, the soot is not generated. Accordingly, the certain temperature is approximately equal to the temperature at NOx generation amount of 10 p.p.m or less.

Once the soot is formed, the post-treatment using simply the catalyst having an oxidization function cannot purify the soot. On the contrary, using such catalyst having an oxidization function can easily purify the precursor of soot or the earlier stage HC. It is therefore, effective to purify the exhaust gas by discharging hydrocarbon under the conditions of the precursor of soot or the earlier stage HC from the combustion chamber 5 as well as reducing the generation of the NOx amount.

It is necessary to restrict the temperature of the fuel and ambient gas at combustion in the combustion chamber 5 in order to stop the hydrocarbon before it grows to soot. In this case, the heat absorbing function of the gas surrounding the combusted fuel greatly influences on the restriction of the temperature. Summarizing the results of the examples in FIGS. 6 and 7, the soot generation is almost zero when the combustion temperature in the combustion chamber 5 is low and at this stage, the precursor of soot or the earlier stage HC.

That is, fuel vapors immediately react with the oxygen included in the air and burn if there is nothing but air around fuel. In this case, the temperature of the air distant from fuel does not increase substantially, and only the temperature of the gas surrounding fuel increases locally to a considerable extent. That is, the air distant from fuel seldom exerts the endothermic effect of the combustion heat of fuel at this moment. In this case, since the combustion temperature increases locally to a considerable extent, the unburned hydrocarbons that have received the combustion heat produce soot.

On the other hand, the circumstances are slightly different if there is fuel in the mixed gas composed of a great amount of inactive gas and a small amount of air. In this case, fuel vapors are diffused around, react with the oxygen mixed into inactive gas, and burn. In this case, since ambient inactive gas absorbs the combustion heat, the combustion temperature does not increase appreciably. Namely, it is possible to maintain the combustion temperature low. In other words, the presence of inactive gas plays an important role in reducing the combustion temperature and the endothermic effect of inactive gas makes it possible to maintain the combustion temperature low.

In this case, the maintaining of the temperature of fuel and ambient gas lower than a temperature corresponding to the production of soot requires such an amount of inactive gas that can absorb heat sufficiently. Accordingly, the required amount of inactive gas increases in proportion to the increase in the amount of fuel. In this case, the endothermic effect is strengthened in proportion to the specific heat of inactive gas. Thus, it is desired that a gas having a great specific heat be used as inactive gas. In this respect, since $CO_2$ and EGR gas have a relatively great specific heat, it may conclude that EGR gas can be desirably used as inactive gas.

FIG. 9 shows the relation between the EGR ratio and the smoke concentration when EGR gas is used as inactive gas and the cooling degree of EGR gas is changed. FIG. 9 shows curves A, B, and C. The curve A indicates a case where the temperature of EGR gas is maintained approximately at 90° C. by intensively cooling EGR gas. The curve B indicates a case where EGR gas is cooled by a compact cooling unit. The curve C indicates a case where EGR is not cooled forcibly. If EGR gas is cooled intensively as indicated by the curve A shown in FIG. 9, the generation amount of soot reaches its peak when the EGR ratio is slightly lower than 50%. In this case, almost no soot is generated if the EGR ratio is made approximately equal to or higher than 55%. On the other hand, if EGR gas is cooled slightly as indicated by the curve B shown in FIG. 9, the generation amount of soot reaches its peak when the EGR ratio is slightly higher than 50%. In this case, almost no soot is generated if the EGR ratio is made approximately equal to or higher than 65%. Further, if EGR gas is not cooled forcibly as indicated by the curve C shown in FIG. 9, the generation amount of soot reaches its peak when the EGR ratio is close to 55%. In this case, almost no soot is generated if the EGR ratio is made approximately equal to or higher than 70%. FIG. 9 shows the generation amount of smoke when the engine load is relatively high. If the engine load lowers, the EGR ratio where the generation amount of soot reaches its peak decreases slightly, and the lower limit of the EGR ratio where almost no soot is generated also decreases slightly. The lower limit of the EGR ratio where almost no soot is generated changes depending on the cooling degree of EGR gas and the engine load.

Figure 10:
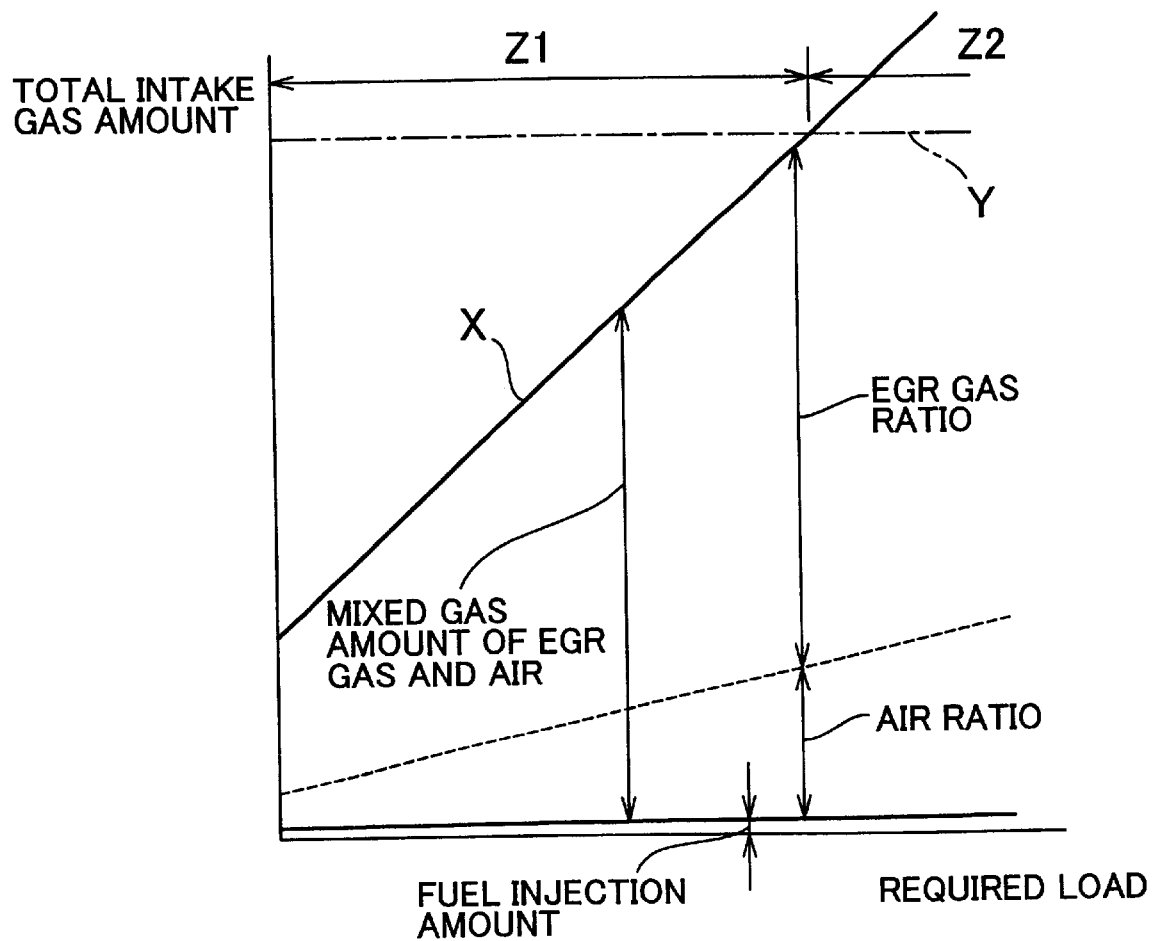
FIG. 10 shows a relation between the fuel injection amount and the mixed gas amount.

FIG. 10 shows the amount of the mixed gas composed of EGR gas and air required for maintaining the temperature of fuel and ambient gas lower than a temperature corresponding to the production of soot, the ratio of air to the mixed gas, and the ratio of EGR gas to the mixed gas, in the case where EGR gas is used as inactive gas. In FIG. 10, the axis of ordinate represents the total amount of the intake gas that can be introduced into the combustion chamber 5, and a chained line Y represents the total amount of the intake gas that can be introduced into the combustion chamber 5 when the supercharging operation is not being performed. The axis of abscissa represents the required load.

Referring to FIG. 10, the ratio of air, namely, the amount of air in mixed gas indicates the amount of air required for complete combustion of injected fuel. Namely, in the case shown in FIG. 10, the ratio of the amount of air to the amount of fuel injection is equal to the theoretical air-fuel ratio. On the other hand, referring to FIG. 10, the ratio of EGR gas, namely, the amount of EGR gas in mixed gas indicates the minimum amount of EGR gas required for maintaining the temperature of fuel and ambient gas lower than a temperature corresponding to the formation of soot, during combustion of injected fuel. This minimum required amount of EGR gas corresponds to the EGR ratio that is approximately equal to or higher than 55%. In the embodiment shown in FIG. 10, the EGR ratio is equal to or higher than 70%. That is, if it is assumed that the total amount of the intake gas introduced into the combustion chamber 5 is indicated by a solid line X shown in FIG. 10 and that the ratios of the amount of air and the amount of EGR gas to the total amount of intake gas X are as shown in FIG. 10, the temperature of fuel and ambient gas is lower than a temperature corresponding to the production of soot. Consequently, no soot is generated. The generation amount of NOx at this moment is approximately equal to or smaller than 10 p.p.m and is therefore considerably small.

Because the heat release value during the combustion of fuel increases in response to the increase in fuel injection amount, the amount of the heat absorbed by EGR gas must be increased in order to maintain the temperature of fuel and ambient gas lower than a temperature corresponding to the production of soot. Thus, as shown in FIG. 10, the amount of EGR gas must be increased in proportion to the increase in fuel injection amount. In other words, the amount of EGR gas must be increased in proportion to the increase in required load. In the load zone Z2 in FIG. 10, the total amount of the intake gas X that is required to prevent the generation of soot exceeds the total amount of the intake gas Y which is the upper limit of the gas X introduced into the combustion chamber 5. Accordingly, it is necessary to provide supercharging or pressure increase operation of the EGR gas and air or the EGR gas to supply the total intake gas X into the combustion chamber sufficiently for preventing the generation of soot. In the load zone Z2 the total intake gas X corresponds to the total intake gas upper limit Y when the supercharging operation is not being performed. Thus, in order to prevent the generation of soot, the air amount has to be reduced slightly to increase the EGR gas amount thereby to burn the fuel under a relatively rich air-fuel ratio.

As explained, FIG. 10 shows a case that the fuel is combusted under the theoretical air-fuel ratio. In the low load operation zone Z1, the soot generation is prevented and at the same time the NOx amount can be restricted to 10 p.p.m max. even the air amount is reduced from the amount shown in FIG. 10 (to enrich the air-fuel ratio).

In the low load operation zone Z1, the soot generation is prevented and at the same time the NOx amount can be restricted to 10 p.p.m maximum, even the air amount is increased from the amount shown in FIG. 10 (to lean the air-fuel ratio to the average value between 17 and 18).

That is, the amount of fuel becomes excessive if the air-fuel ratio is made rich. However, since the combustion temperature is maintained low, the excessive fuel does not grow into soot. Consequently, no soot is produced. At this moment, the generation amount of NOx is also considerably small. On the other hand, a small amount of soot is produced in response to a increase in the combustion temperature when the average air-fuel ratio is lean or when the air-fuel ratio is theoretical. However, according to the invention, since the combustion temperature is maintained low, no soot is produced. Furthermore, the generation amount of NOx is also considerably small. Thus, no soot is generated during low-temperature combustion regardless of the air-fuel ratio, namely, whether the air-fuel ratio is rich or theoretical, or whether the average air-fuel ratio is lean. That is to say, the generation amount of NOx is considerably small. Thus, from the standpoint of enhancement of the fuel consumption rate, it is desired that the average air-fuel ratio be made lean in this case.

The temperature of fuel and ambient gas during combustion in the combustion chamber can be made equal to or lower than a temperature where the growth of hydrocarbons is stopped before its completion, only when a relatively small amount of heat is released due to combustion, namely, when the engine load is intermediate or low. Thus, in the embodiment according to the invention, when the engine load is intermediate or low, first combustion, namely, low-temperature combustion is carried out with the temperature of fuel and ambient gas during combustion being maintained equal to or lower than a temperature where the growth of hydrocarbons is stopped before its completion. In this embodiment, when the engine load is high, second combustion, namely, normal combustion is carried out. As is apparent from the foregoing description, the first combustion, namely, low-temperature combustion refers to the combustion of a type wherein the amount of inactive gas in the combustion chamber is greater than the amount of inactive gas corresponding to a maximum generation amount of soot and wherein almost no soot is generated, and the second combustion, namely, normal combustion refers to the combustion of a type wherein the amount of inactive gas in the combustion chamber is smaller than the amount of inactive gas corresponding to a maximum generation amount of soot.

Figure 11:
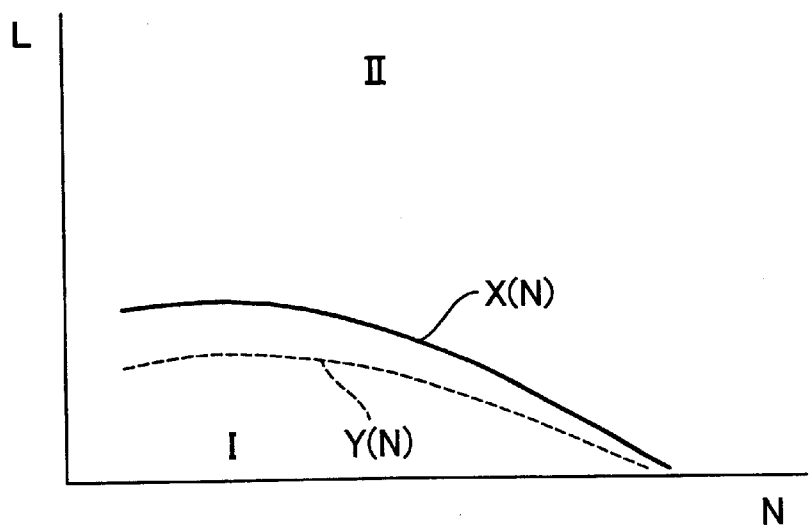
FIG. 11 shows a first operation zone I and a second operation zone II.

FIG. 11 shows a first operation zone I, where the first combustion, namely low-temperature combustion, is carried out and a second operation zone II, where the second combustion, namely, normal combustion is carried out. In FIG. 11, the axis of ordinate L represents the depression amount of the accelerator pedal 40, namely, the required load, and the axis of abscissa N represents the engine speed. In FIG. 11, X(N) represents a first border between the first operation zone I and the second operation zone II, and Y(N) represents a second border between the first operation zone I and the second operation zone II. A shift of the operation zone from the first operation zone I to the second operation zone II is determined based on the first border X(N), and a shift of the operation zone from the second operation zone II to the first operation zone I is determined based on the second border (N). That is, if the required load L exceeds the first border X(N) expressed as a function of the engine speed N during low-temperature combustion with the engine being in the first operation zone I, it is determined that the operation zone has shifted to the second operation zone II, and normal combustion is carried out. If the required load L drops below the second border Y(N) expressed as a function of the engine speed N, it is determined that the operation zone has shifted to the first operation zone I, and low-temperature combustion is carried out again.

Figure 12:
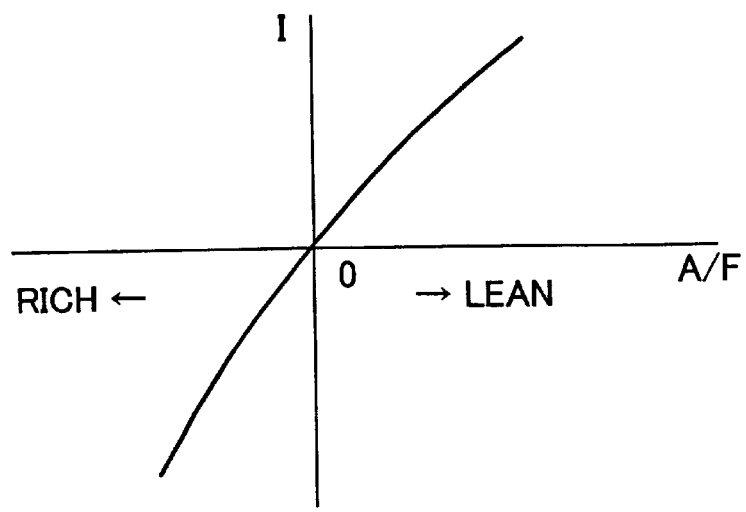
FIG. 12 shows an output of air-fuel sensor.

FIG. 12 shows the output of an air-fuel ratio sensor (not shown). As shown in FIG. 12, the output current I of the air-fuel ratio sensor changes depending on the air-fuel ratio A/F. Thus the air-fuel ratio can be detected from the output current I of the air-fuel ratio sensor.

Figure 13:
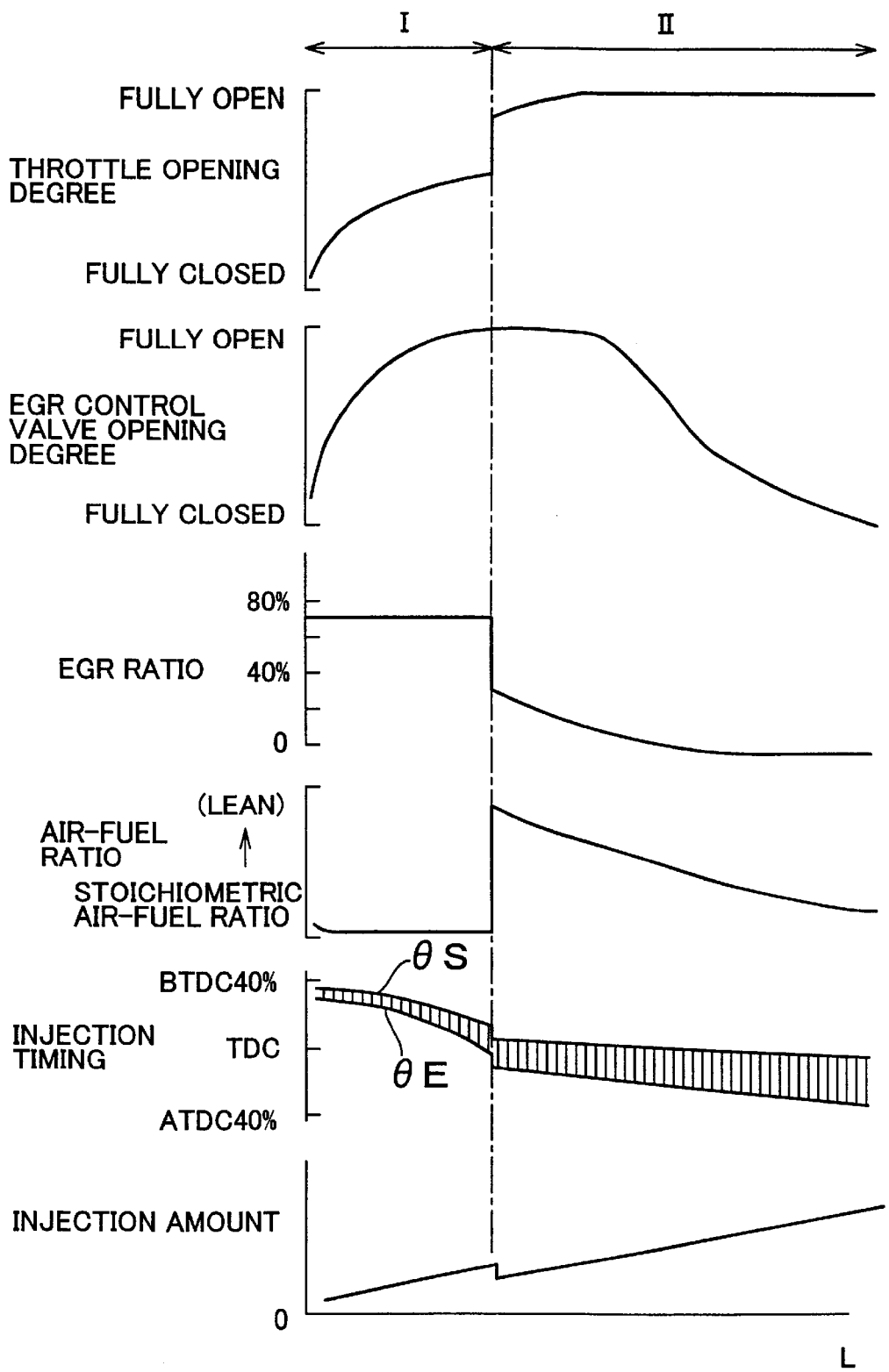

Referring now to FIG. 13, the outline of operation controls in the first operation zone I and the second operation zone II will be described. FIG. 13 shows how the opening of the throttle valve 16, the opening of the EGR control valve 25, the EGR ratio, the air-fuel ratio, the fuel injection timing and the fuel injection amount change as the required load L changes. As shown in FIG. 13, in the first operation zone I where the required load L is low, the opening of the throttle valve 16 gradually increases approximately from its full-closed state to an opening of two-thirds as the required load L increases, and the opening of the EGR control valve 25 gradually increases approximately from its full-closed state to its full-open state as the required load L increases. In the example shown in FIG. 13, in the first operation zone I, the EGR ratio is approximately equal to 70% and the air-fuel ratio is somewhat lean.

In other words, in the first operation zone I, the opening degree of the throttle valve 16 and the EGR control valve 25 are controlled such that the EGR ratio becomes approximately equal to 70% and that the air-fuel ratio becomes somewhat lean. In the first operation zone I, fuel injection is carried out before the compression top dead center TDC. In this case, the fuel injection start timing θS is retarded in proportion to the increase in the required load L. The fuel injection end timing θE is also retarded in proportion to the retardation in the fuel injection start timing θS. During idling operation, the throttle valve 16 is closed approximately to its full-closed state and the EGR control valve 25 is also closed approximately to its full-closed state. If the throttle valve 16 is closed approximately to its full-closed state, the pressure in the combustion chamber 5 at the beginning of compression decreases and thus the compression pressure decreases. If the compression pressure decreases, the compression work done by the piston 4 decreases and thus the vibration of the engine 1 is damped. That is, during idling operation, the throttle valve 16 is closed approximately to its full-closed state to damp the vibration of the engine 1.

On the other hand, if the operation zone of the engine shifts from the first operation zone I to the second operation zone II, the opening of the throttle valve 20 is increased stepwise from the opening of two-thirds toward its full-open state. At this moment, in the example shown in FIG. 13, the EGR ratio is reduced stepwise approximately from 70% to 40% or less, and the air-fuel ratio is increased stepwise. That is, since the EGR ratio exceeds an EGR ratio zone (see FIG. 9) where a great amount of smoke is generated, a shift of the operation zone of the engine from the first operation zone I to the second operation zone II do not cause generation of a great amount of smoke. In the second operation zone II, normal combustion is carried out. In the second operation zone II, the throttle valve 16 is mostly maintained in its full-open state and the opening of the EGR control valve 25 is gradually reduced in proportion to the increase in the required load L. In the operation zone II, the EGR ratio decreases in proportion to the increase in the required load L, and the air-fuel ratio decreases in proportion to the increase in the required load L. However, the air-fuel ratio remains lean even if the required load L has increased. In the second operation zone II, the fuel injection start timing θS is close to the compression top dead center TDC.

Figure 14:
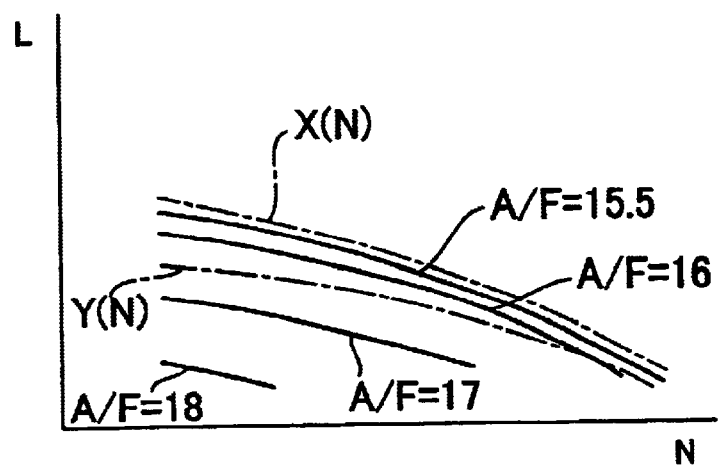
FIG. 14 shows an air-fuel ratio in the first operation zone I.

FIG. 14 shows the air-fuel ratios A/F in the first operation zone I. In FIG. 14, curves marked with A/F=15.5, A/F=16, A/F=17 and A/F=18 indicate that the target air-fuel ratio is equal to 15.5, 16, 17 and 18 respectively, and the air-fuel ratios among the curves are determined by proportional distribution. As shown in FIG. 14, the air-fuel ratio is lean in the first operation zone I, and the air-fuel ratio A/F becomes leaner as the required load L decreases in the first operation zone I. That is, the heat release value resulting from combustion decreases in proportion to the decrease in the required load L. Thus, the possibility of carrying out low-temperature combustion increases in proportion to the decrease in the required load L even if the EGR ratio has been reduced. The air-fuel ratio increases if the EGR ratio is reduced. Thus, as shown in FIG. 14, the target air-fuel ratio A/F is increased in proportion to the decrease in the required load L. The fuel consumption rate is enhanced in proportion to the increase in the target air-fuel ratio A/F. Thus, in this embodiment, in order to make the air-fuel ratio as lean as possible, the target air-fuel ratio A/F is increased in proportion to the decrease in the required load L.

Figure 15A:
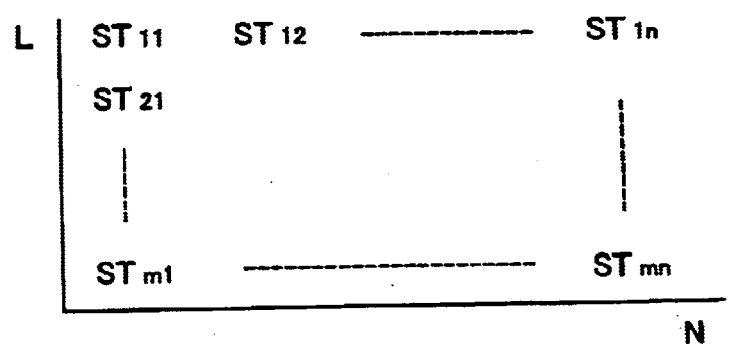
FIG. 15A and FIG. 15B show maps for target opening degree of the throttle valve and others.
Figure 15B:
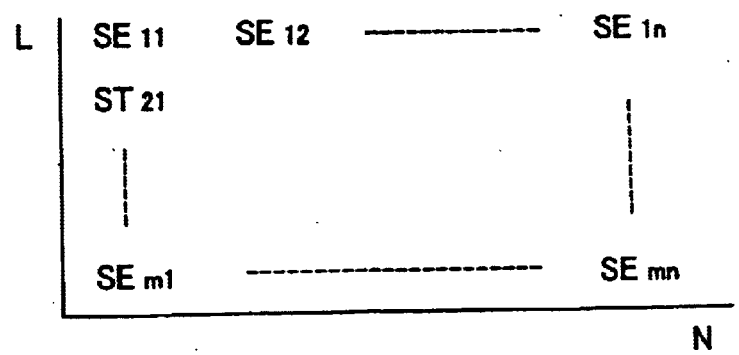

The target openings ST of the throttle valve 16 required for making the air-fuel ratio equal to the target air-fuel ratios shown in FIG. 14 are stored in advance in the ROM 32 in the form of a map as a function of the required load L and the engine speed N as shown in FIG. 15A. The target openings SE of the EGR control valve 23 required for making the air-fuel ratio equal to the target air-fuel ratios shown in FIG. 14 are stored in advance in the ROM 32 in the form of a map as a function of the required load L and the engine speed N as shown in FIG. 15B.

Figure 16:
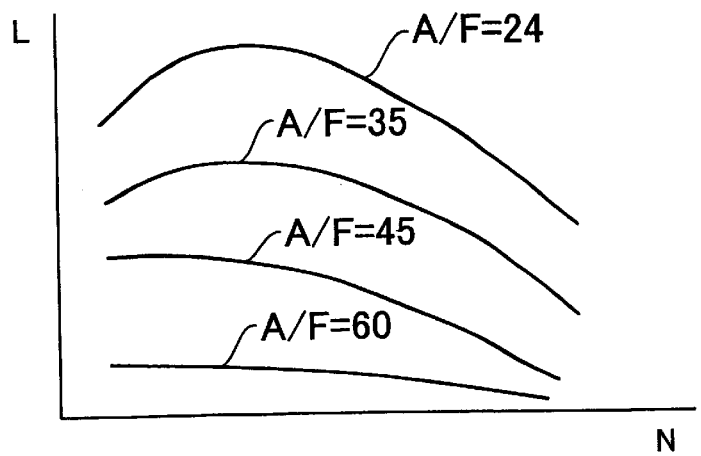
FIG. 16 shows an air-fuel ratio at the second combustion.
Figure 17A:
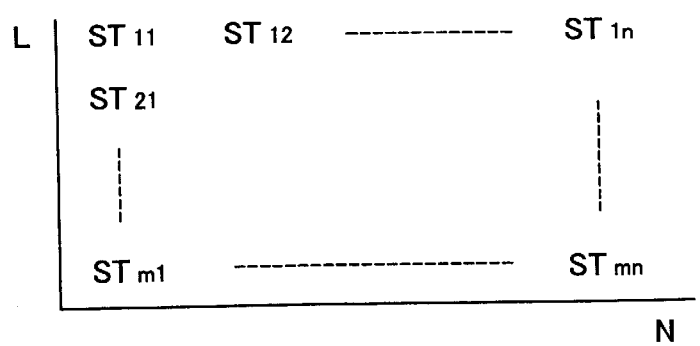
FIG. 17A and FIG. 17B show target opening degree of the throttle valve.
Figure 17B:
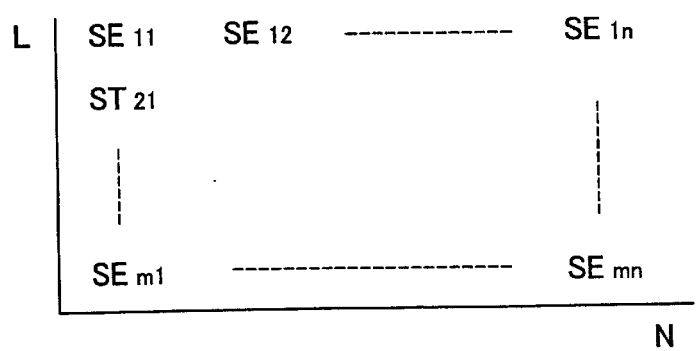

FIG. 16 shows the target air-fuel ratios A/F during the second combustion, namely, normal combustion. In FIG. 16 curves marked with A/F=24, A/F=35, A/F=45 and A/F=60 indicate that the air-fuel ratio is equal to 24, 35, 45 and 60, respectively. The target openings ST of the throttle valve 16 required for making the air-fuel ratio equal to the target air-fuel ratios are stored in advance in the ROM 32 in the form of a map as a function of the required load L and the engine speed N as shown in FIG. 17A. The target openings SE of the EGR control valve 23 required for making the air-fuel ratio equal to the target air-fuel ratios are stored in advance in the ROM 32 in the form of a map as a function of the required load L and the engine speed N as shown in FIG. 17B.

According to the embodiment of the invention, in the diesel engine, the first combustion, in other words, the low temperature combustion and the second combustion, in other words, normal combustion are switched based on the depression amount L of accelerator 40 and engine rotational number N and at each combustion stage, the openings of throttle valve 16 and EGR valve are controlled by the map shown in FIG. 15 or 17.

Figure 18:
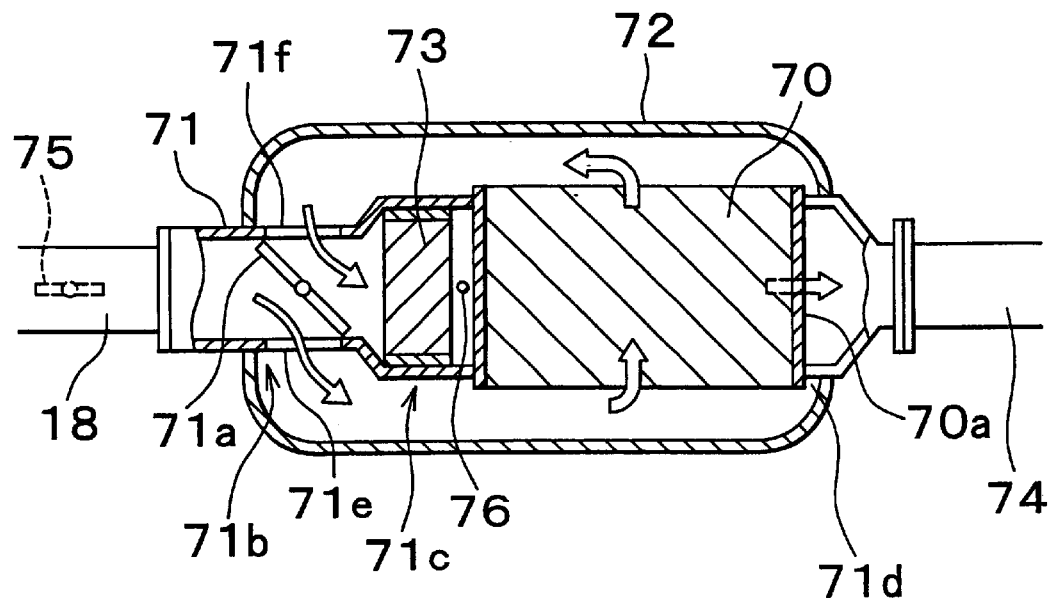
FIG. 18 shows a cross sectional view of the exhaust gas purifier.
Figure 19:
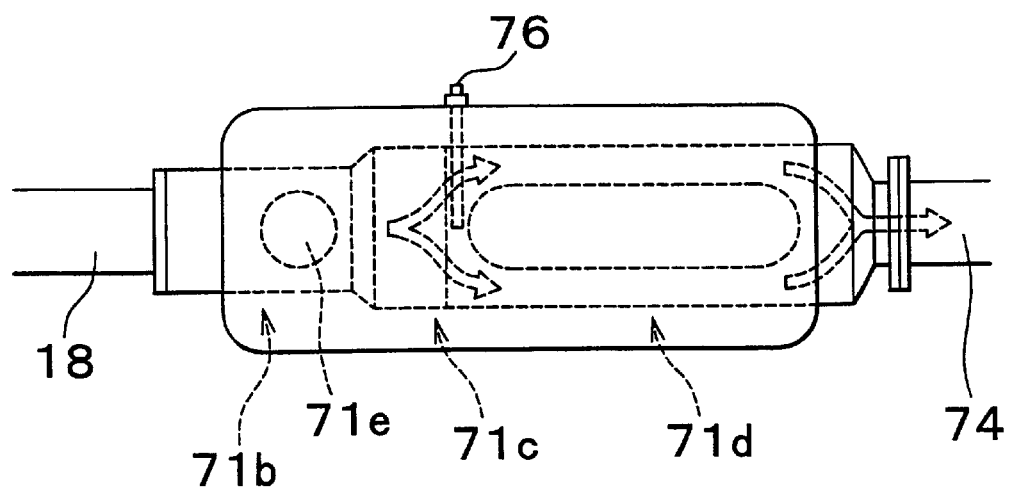
FIG. 19 shows a side view of the exhaust gas purifier shown in FIG. 18.

FIG. 18 shows a plane view of the exhaust purifier and FIG. 19 is a side view of the purifier of FIG. 18. The exhaust gas purifier includes a central conduit member 71 and a cover member 72 surrounding the central conduit member 71. The upstream end of the central conduit member 71 is connected to the downstream side of the exhaust manifold 17 through the exhaust pipe 18 and the downstream end is connected to a downstream exhaust pipe 74 via a muffler for discharging the exhaust gas to the atmosphere. The central conduit member 71 includes an upstream portion 71b provided with a valve body 71a, a central stream portion 71c positioned immediately down side of the upstream portion 71b and a downstream portion 71d positioned immediately down side of the central stream portion 71c.

A first opening 71e and a second opening 71f opposite thereto are formed on the side surface of the upstream portion 71b. The valve body 71a is rotated to be in two interrupting positions for interrupting the upstream portion 71b between the upstream and downstream by rotation of a vacuum actuator or a step motor.

At the one interrupting position of the valve body 71a shown in FIG. 18, the upstream side and the first opening 71e are in communication and at the same time the downstream side and the second opening 71f are in communication. At the other interrupting position of the valve body 71a shown in FIG. 20, the upstream side and the second opening 71f are in communication and at the same time the downstream side and the first opening 71e are in communication.

A temperature sensor 76 is provided in the central stream portion 71c in which the catalyst device 73 is disposed, at the direct downstream of the catalyst device 73 for detecting the exhaust gas temperature therein. A particulate filter 70 with an elongated circular shape in cross section is disposed together with an outside case 70a and penetrates through the downstream portion 71d along the side surface.

Figure 20:
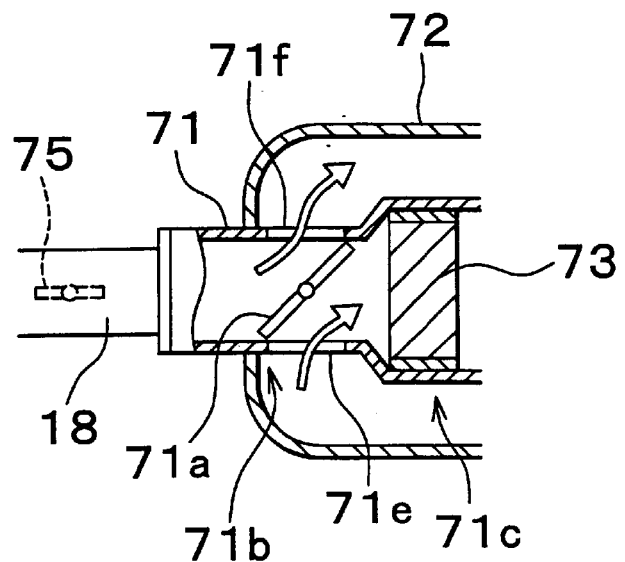
FIG. 20 shows another interrupting position of the valve body.

When the valve 71a is rotated to be in the one interrupting position the exhaust gas flows from the upstream side of the upstream portion 71b through the first opening 71e to a space between the cover member 72 and the central conduit member 71 as shown in arrows in FIGS. 19 and 20. The exhaust gas then passes through the particulate filter 70 through the second opening 71f and flows into the upstream portion 71b again. Thereafter, the exhaust gas flows around the outside case 70a of the filter 70 and flows toward the downstream exhaust pipe 74.

On the other hand, when the valve 71a is rotated to be in the other interrupting position, the exhaust gas flows from the upstream side of the upstream portion 71b through the second opening 71f to the space between the cover member 72 and the central conduit member 71 as shown in arrows in FIG. 20. The exhaust gas then passes through the particulate filter 70 in opposite direction to the case of the one interrupting position and flows through the first opening 71e and flows into the upstream portion 71b again. Thereafter, the exhaust gas flows around the outside case 70a of the filter 70 and flows toward the downstream exhaust pipe 74.

Figure 21:
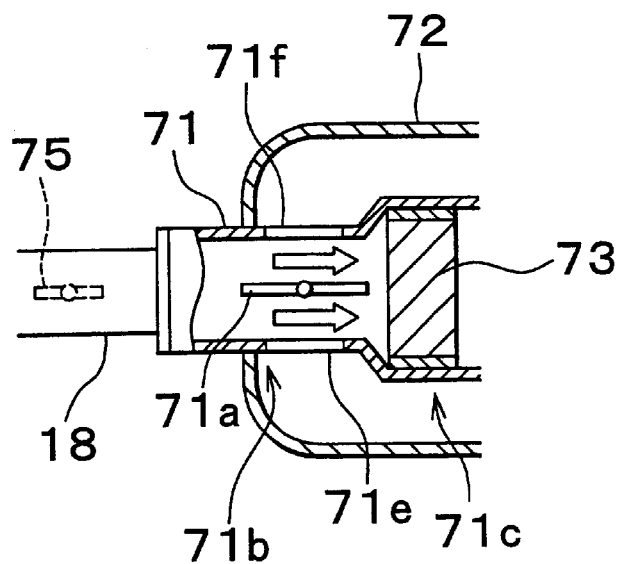
FIG. 21 shows an intermediate position of the valve body.

As shown in FIG. 21, the valve body 71a can be also positioned at an intermediate position between the two interrupting positions. At this intermediate position, the upstream portion 71b of the central conduit member 71 is open, the exhaust gas flows directly into the catalyst device 73 disposed in the central stream portion 71c without passing through the space between the cover member 72 and the central conduit member 71, in other words, without passing through the particulate filter 70.

According to this structure, the exhaust gas purifier according to the invention can be simply constructed and by switching the interrupting position from one place to the other to reverse the exhaust gas flow path between the downstream and upstream sides. Further, when the valve body 71a is positioned at the intermediate between the two interrupting positions, the exhaust gas can bypass the particulate filter 70.

The particulate filter is usually required to have a large opening area for easy passing of the exhaust gas, but according to this embodiment, a large opening area can be provided without influencing on the vehicle installability as shown in FIG. 18. An exhaust throttle valve 75 is provided in the exhaust pipe 18 as shown in FIG. 18.

Figure 22A:
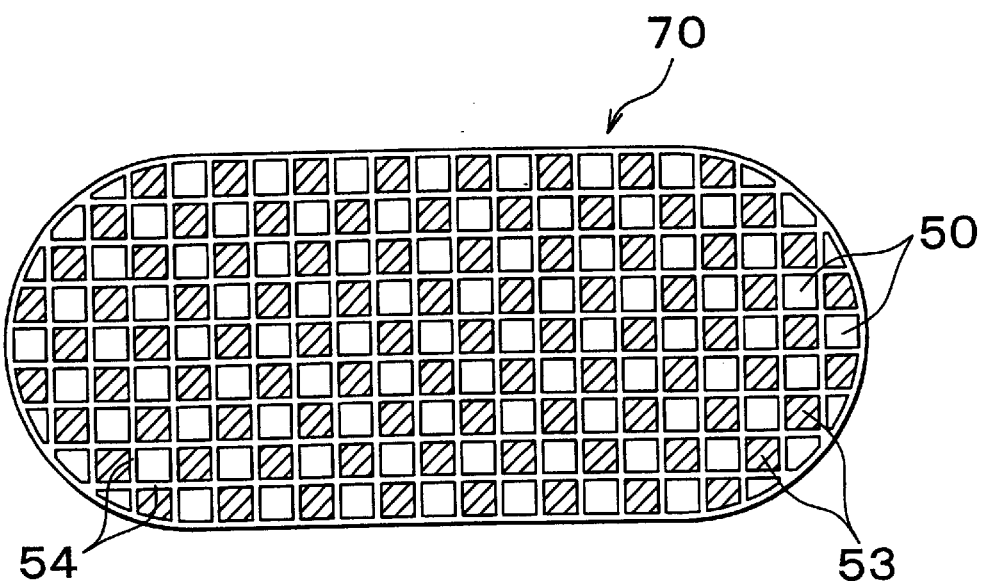
FIG. 22A and FIG. 22B show structures of the particulate filter.
Figure 22B:
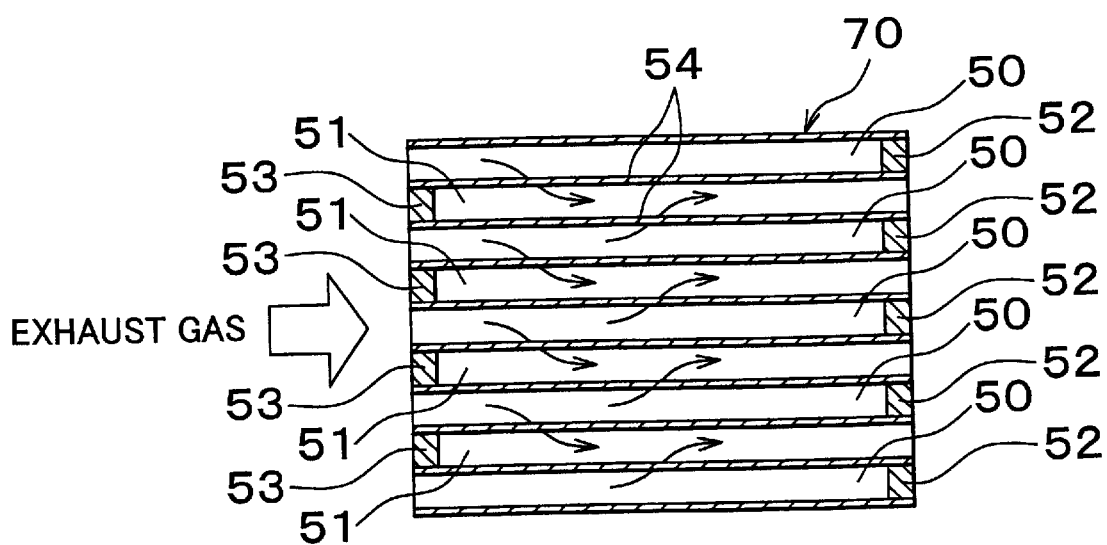

FIGS. 22A and 22B show the filter 70 structure and FIG. 22A is a front view of the particulate filter and FIG. 22B is the side view thereof. As shown in these drawings, the particulate filter 70 is of an elongated circular shape and has a honeycomb structure made from a porous material such as cordierite. The filter is a wall-flow type and has a plurality of spaces in axial direction and finely divided by the partition walls extending in axial direction. One of the adjacent two spaces in axial direction is closed at the downstream side of the exhaust gas by a plug 52, and the other is closed at the upstream side of the exhaust gas by the plug 53.

These two spaces are composed of exhaust gas inflow passages 50 that are closed at the downstream and exhaust gas outflow passages 51 that are closed at the upstream and the entire exhaust gas passes through the partition walls 54. The particulates are very small contained in the exhaust gas relative to the size of the fine holes of the wall 54 and collected on the upstream side surface of the walls 54 and the fine hole surface in the walls 54 by colliding thereon.

According to the particulate filter 70 of the embodiment, alumina is used as oxidization removal of the particulates on both side surfaces of the partition wall 54 and preferably on the front surface of the fine holes in the partition wall 54 and the following active oxygen release agent and noble metal catalyst are carried thereby.

As the noble metal catalyst, for example, platinum Pt is used and as an active oxygen release agent at least one material selected from alkaline metals such as kalium K, natrium Na, lithium Li rubidium Rb and cesium Cs, alkaline earth elements such as barium Ba strontium Sr and calcium Ca, and rare earth elements such as lanthanum La and yttrium Y is used.

As the active oxygen release agent, an alkaline metal or an alkaline earth metal that is higher in ionization tendency than calcium Ca, namely, kalium K, lithium Li, cesium Cs, rubidium Rb, barium Ba or strontium Sr is preferred.

On the basis of an example in which platinum Pt and kalium K are carried on the carrier, it will now be described how the particulate filter eliminates the particulates in exhaust gas. A similar effect of eliminating particulates is achieved if other noble metals, alkaline metals, alkaline earth metals, rare earth elements and transition metals are used.

Because combustion is carried out with an excessive amount of air in the diesel engine, exhaust gas includes a great amount of excessive air. That is, if the ratio of air and fuel supplied to the intake passage and the combustion chamber is referred to as the air-fuel ratio of exhaust gas, the air-fuel ratio is lean. Because NO is generated in the combustion chamber, exhaust gas includes NO. Fuel includes sulfur S, which reacts with the oxygen in the combustion chamber and turns into $SO_2$. Therefore, exhaust gas includes $SO_2$. Accordingly, the exhaust gas including excessive oxygen, NO and $SO_2$ flows into the exhaust gas upstream side of the filter 70.

Figure 23A:
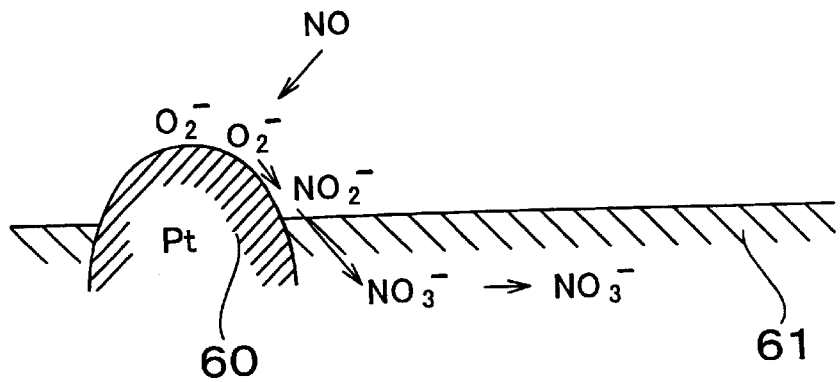
FIG. 23A and FIG. 23B show the explanations of oxidization of the particulates.
Figure 23B:
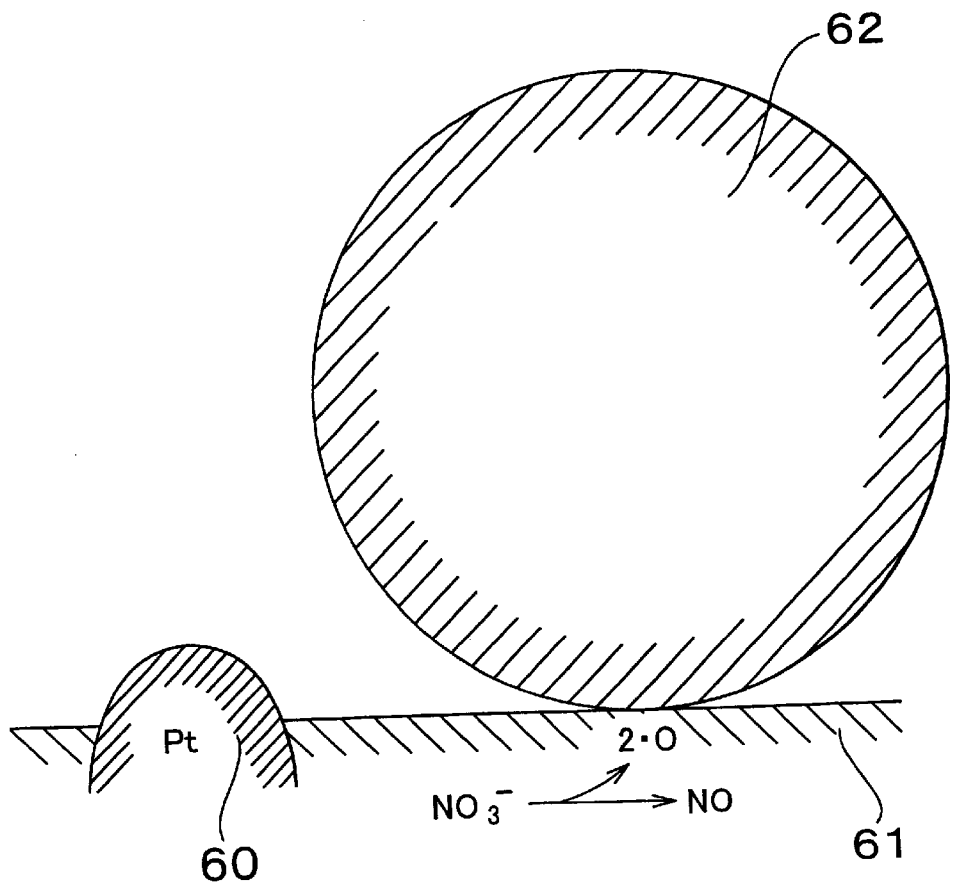

FIGS. 23A and 23B are general enlarged views of the contact surfaces of the exhaust gas in the particulate filter 70.

FIGS. 23A and 23B show a particle 60 of platinum Pt and active oxygen release agent 61 including kalium K. Exhaust gas includes a great amount of excessive oxygen as described above. Therefore, if exhaust gas contacts the surfaces in the particulate filter 70, oxygen elements $O_2$ adhere to the surface of platinum Pt in the form of $O_2^-$ or $O^{2-}$ as shown in FIG. 23A. On the other hand, the NO in exhaust gas reacts with $O_2^-$ or $O^{2-}$ on the surface of platinum Pt and turns into $NO_2$ ($2NO+O_2 \rightarrow 2NO_2$). A portion of the produced $NO_2$ is then absorbed into the active oxygen release agent 61 while being oxidized on platinum Pt. Coupled with kalium K, $NO_2$ is diffused into the active oxygen release agent 61 in the form of nitrate ion $NO_3^-$ as shown in FIG. 23A, and produces kalium nitrate $KNO_3$.

On the other hand, as described above, exhaust gas also includes $SO_2$, which is also absorbed into the active oxygen release agent 61 by a mechanism similar to that of NO. That is, as described above, oxygen elements $O_2$ adhere to the surface of platinum Pt in the form of $O_2^-$ or $O^{2-}$, and the $SO_2$ in exhaust gas reacts with $O_2^-$ or $O^{2-}$ on the surface Pt and turns into $SO_3$. A portion of the produced $SO_3$ is absorbed into the active oxygen release agent 61 while being further oxidized on platinum Pt. Coupled with kalium K, $SO_3$ is diffused into the active oxygen release agent 61 in the form of sulfate ion $SO_4^{2-}$ and produces kalium sulfate $K_2SO_4$. In this manner, kalium nitrate $KNO_3$ and kalium sulfate $K_2SO_4$ are produced in the active oxygen release agent 61.

Particulate 62 contained in exhaust gas adhere to the surface of the active oxygen release agent 61 as is indicated in FIG. 23B. The temperature of the contacting surfaces between the particulates and the active oxygen release agent decreases by such contact. If the concentration of oxygen decreases, there is generated a difference in concentration between the particulate 62 and the inside of the active oxygen release agent 61, which demonstrates a high concentration of oxygen. Therefore, the oxygen in the active oxygen release agent 61 is urged to move towards the contact surface between the particulate 62 and the active oxygen release agent 61. As a result, the kalium nitrate $KNO_3$ formed in the active oxygen release agent 61 is decomposed into kalium K, oxygen O and NO. The oxygen O moves towards the contact surface between the particulate 62 and the active oxygen release agent 61, and NO is released from the active oxygen release agent 61 to the outside. The NO released to the outside is oxidized on the downstream platinum Pt and again absorbed into the active oxygen release agent 61.

On the other hand, the kalium sulfate $K_2SO_4$ formed in the active oxygen release agent 61 is also decomposed into kalium K, oxygen O and $SO_2$. The oxygen O moves towards the contact surface between the particulate 62 and the active oxygen release agent 61, and $SO_2$ is released from the active oxygen release agent 61 to the outside. The $SO_2$ released to the outside is oxidized on the downstream platinum Pt and again absorbed into the active oxygen release agent 61. However, kalium sulfate $K_2SO_4$ has been stabilized and thus is more unlikely to release active oxygen than kalium sulfate $KNO_3$.

On the other hand, the oxygen O moving towards the contact surface between the particulate 62 and the active oxygen release agent 61 is decomposed from compounds such as kalium nitrate $KNO_3$ and kalium sulfate $K_2SO_4$. The oxygen O decomposed from a compound is high in energy level and demonstrates an extremely high degree of activity. Accordingly, the oxygen moving towards the contact surface between the particulate 62 and the active oxygen release agent 61 is active oxygen O. If the active oxygen O comes into contact with the particulate 62, the particulates 62 are oxidized within a short time, a few minutes to dozen of minutes, without generating luminous flames. It is considered that NOx are diffused in the active oxygen release agent 61 in the form of nitrate iron $NO_3^-$ while repeatedly connecting to and separating from oxygen atoms. Active oxygen is generated also during this period. This active oxygen oxidizes the particulates 62 also. Further, the particulates 62 that have thus adhered onto the particulate filter 70 are oxidized by active oxygen O but are oxidized also by oxygen in exhaust gas.

Platinum Pt and the active oxygen release agent 61 are activated in proportion to the increase in temperature of the particulate filter 70. The amount of the active oxygen O that can be released from the active oxygen release agent 61 per unit time increases in proportion to the increase in temperature of the particulate filter 70. As a matter of course, particulates are more likely to be removed by oxidization as the temperature of the particulates themselves increases. Accordingly, the amount of the particulates that can be eliminated through oxidization on the particulate filter 70 per unit time without generating luminous flames increases in proportion to the increase in temperature of the particulate filter 70.

Figure 24:
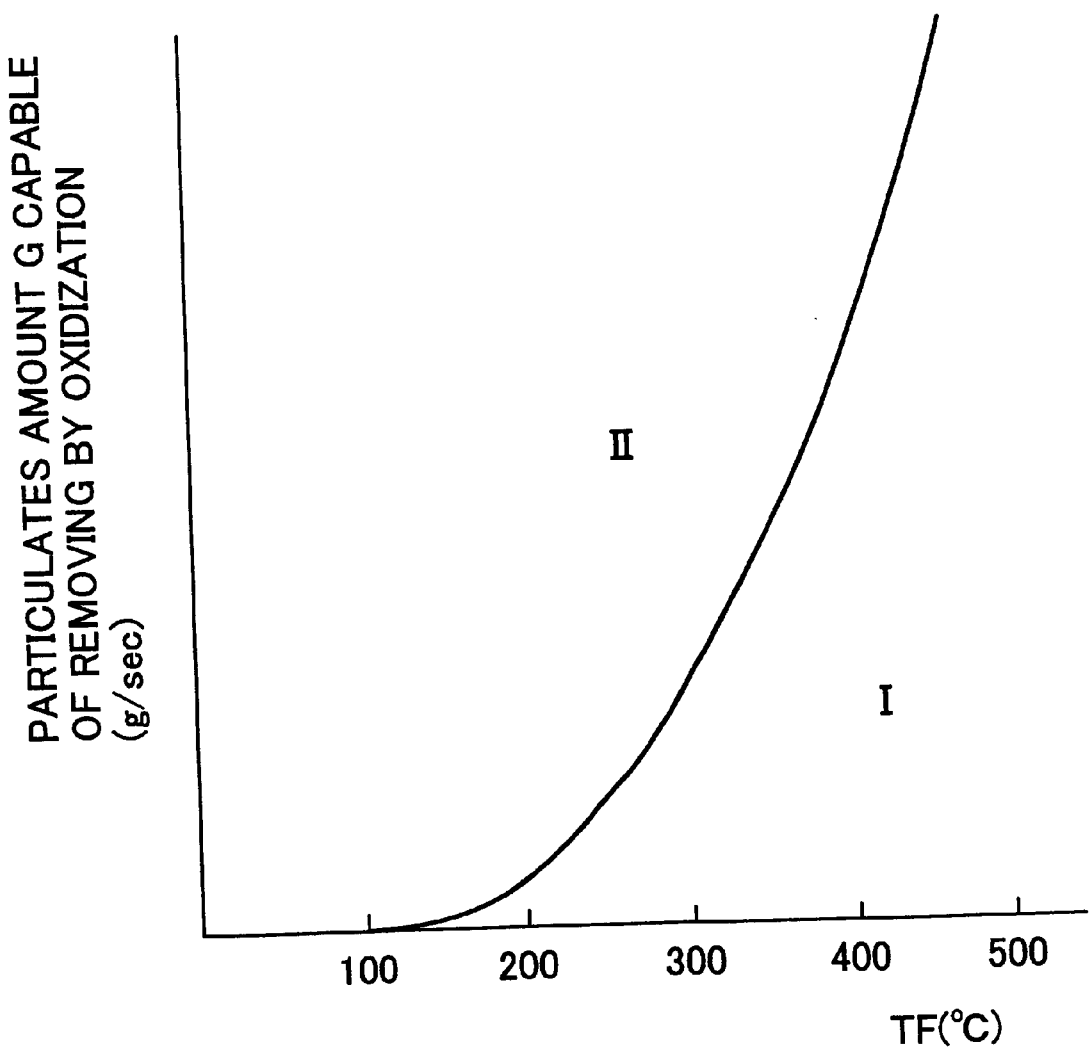
FIG. 24 shows a relation between the oxidization removable particulates amount and the temperature of the particulate filter.

FIG. 24 shows with a solid line the amount G of the particulates that can be eliminated through oxidization per unit time without generating luminous flames. In FIG. 24, the axis of abscissa represents the temperature TF of the particulate filter 70. Although FIG. 24 shows the amount of particulates G that can be removed by oxidization in the case where the unit time is one second, i.e., per one second, the unit time can be an arbitrary length of time such as one minute, ten minutes, etc. For instance, in the case where the unit time is ten minutes, the amount of particulates G that can be removed per unit time by oxidization represents the amount of particulates G that can be removed per ten minutes by oxidization. In this case, the amount of particulates G that can be removed per unit time by oxidization on the particulate filter 70 without luminous flame is likewise increased as the temperature of the particulate filter 70 increases, as shown in FIG. 24 The amount of the particulates discharged from the combustion chamber per unit time is referred to as the amount M of discharged particulates. If the amount M of discharged particulates is smaller than the amount G of the particulates that can be eliminated through oxidization as in a zone I shown in FIG. 24 all the particulates discharged from the combustion chamber are eliminated through oxidization on the particulate filter 70 successively within a short time without generating luminous flames when they come into contact with the particulate filter 70.

Figure 25A:
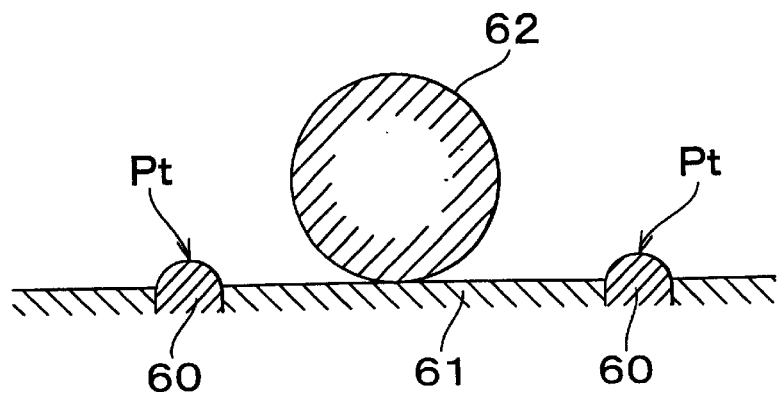
FIG. 25A, FIG. 25B and FIG. 25C show explanations of particulate accumulation.
Figure 25B:
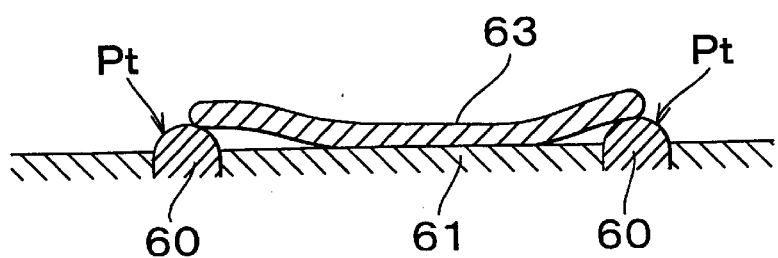
Figure 25C:
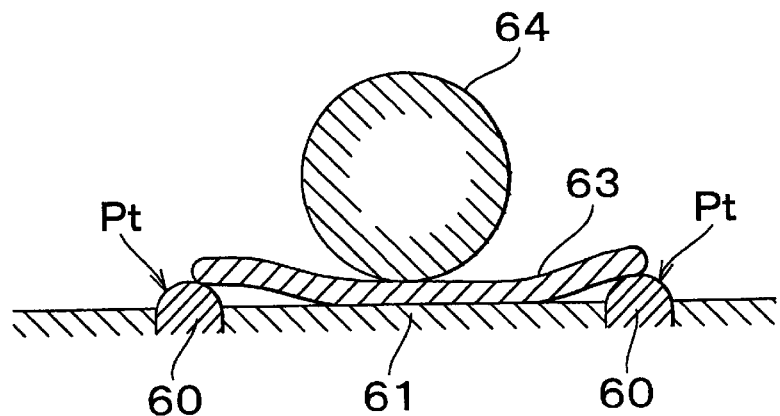

On the other hand, if the amount M of discharged particulates is greater than the amount G of the particulates that can be eliminated through oxidization as in a zone II shown in FIG. 24, the amount of active oxygen is insufficient to oxidize all the particulates. FIGS. 25A, 25B, and 25C show how a particulate is oxidized in such a case. That is, in the case where the amount of active oxygen is insufficient to oxidize all the particulates, if the particulate 62 adheres to the active oxygen release agent 61 as shown in FIG. 25A, only a portion of the particulate 62 is oxidized, and the portion of the particulate 62 that has not been oxidized sufficiently remains on the carrier layer. If the amount of active oxygen continues to be insufficient, the portion of the particulate that has not been oxidized gradually remains on the carrier layer one after another. As a result, as shown in FIG. 25B, the surface of the upstream side of the filter is covered with a remaining particulate portion 63.

The remaining particulate portion 63 is gradually transformed into a carbon material, which is unlikely to be oxidized. Thus the remaining particulate portion 63 tends to remain where it is. If the surface of the upstream side is covered with the remaining particulate portion 63, the NO— and $SO_2$-oxidization effect of platinum Pt and the active oxygen release effect of the active oxygen release agent 61 are weakened. As a result, one particulate 64 after another is accumulated on the remaining particulate portion 63 as shown in FIG. 25C. That is, particulates are accumulated in a laminated manner. If particulates are thus accumulated in a laminated manner, the particulates are no longer oxidized by active oxygen O. Even if the particulates are likely to be oxidized, they are not oxidized by active oxygen because they are spaced apart from platinum Pt and the active oxygen release agent 61. Thus one particulate after another is accumulated on the particulate 64. Namely, if the amount M of discharged particulates remains greater than the amount G of the particulates that can be eliminated through oxidization, particulates are accumulated in a laminated manner on the particulate filter. Therefore, the accumulated particulates cannot be burnt through ignition unless exhaust gas or the particulate filter 70 is heated up.

In this manner, most of the particulates are oxidized on the particulate filter 70 within a relatively short period without generating luminous flames in the zone I shown in FIG. 24, and particulates are accumulated in a laminated manner on the particulate filter in the zone II shown in FIG. 24. Thus, the particulates being accumulated in a laminated manner on the particulate filter can be prevented by matching the relation between the amount M of discharged particulates and the amount G of the particulates that can be eliminated through oxidization corresponding to the relation indicated in the zone I shown in FIG. 24.

Thus, the pressure loss of exhaust gas flow in the particulate filter 70 scarcely changes and is maintained at a substantially constant minimum pressure loss value. Thus, the decrease in engine output can be maintained at its minimum value.

However, it is not always realized and if nothing is done, the particulates may be accumulated on the particulate filter.

Figure 26:
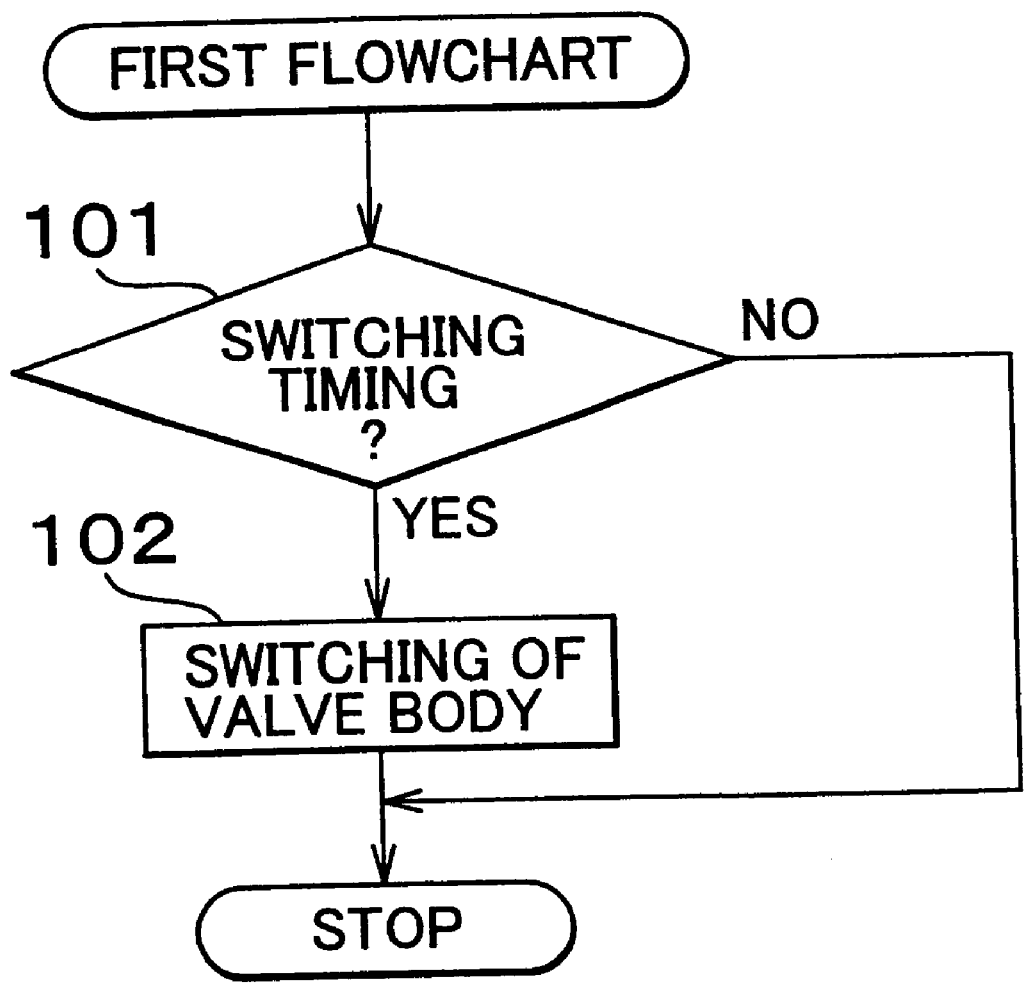
FIG. 26 shows a first flowchart for preventing the accumulation of the particulates on the particulate filter.

According to the embodiment, the electric control unit 30 controls the valve body 71a to operate according to the first flowchart in FIG. 26 to prevent the accumulation of the particulates on the filter. The process of this flowchart is repeated for a certain time period. In step 101, the control units determines whether the valve is switched or not. The valve switching timing is determined by a predetermined time or to be determined by a certain mileage of the vehicle. If determined No, the procedure terminates and if determined Yes, proceeds to step 102 to rotate the valve body 71a from the current interrupting position to the other interrupting position.

FIGS. 27A and 27B show an enlarged cross section of the partition wall 54 of the filter. As described, the exhaust gas upstream side front surface of the partition wall 54 and the flow opposing surface of the exhaust gas in the fine holes collect the particulate by collision as a collecting surface and removes the collected particulates by active oxygen discharged from the active oxygen release agent by oxidization. During the set timing or the set mileage timing, the vehicle may be operated under the zone I in FIG. 24 and the particulates remain on the grid as shown in FIG. 27A due to insufficient oxidization. This small amount accumulation may not influence on the driving of the vehicle but if the amount of accumulation becomes larger, the engine output may be reduced to a great amount. However, if the reversion is made between the exhaust gas upstream side and downstream side of the filter, no further increase of the remaining particulates on the collecting surface of one side of the wall 54 is generated and the collected particulates are gradually oxidized to be removed by the active oxygen released from the other collecting surface. The remaining particulates in the fine holes are destroyed and divided into fine pieces by the reverse flow of the exhaust gas as shown in FIG. 27B and moves to the downstream side.

Most of the finely divided particulates are dispersed within the fine holes in the partition wall 54, in other words, such flowing particulates are removed by oxidization by the direct contact with the active oxygen release agent carried on the surface of the fine holes of the wall 54. By carrying the active oxygen release agent in the fine holes of the partition wall 54, the remaining particulates can be easily removed by the oxidization.

In addition to the oxidization, by reversing the exhaust gas flow, at the other collecting surface of the partition wall 54 becomes the upstream side and collision is taken place on the surface of this side (opposite to the other collecting surface) with the new particulates in the exhaust gas and the new particulates are oxidized by the active oxygen discharged from the active oxygen release agent. The part of the active oxygen discharged from the active oxygen release agent flows downstream with the exhaust gas and oxidize the remaining particulates, which are remained in spite of the reverse flow of the exhaust gas.

In other words, the remaining particulates on one side of the collecting surface of the partition wall 54 are oxidized to be removed by not only the active oxygen released from the collecting surface but also the remaining active oxygen used by the oxidization on the other side of the collecting surface by reversing of the exhaust gas flow.

At the valve switching timing, even when some particulates are accumulated in layers or in a laminated manner, on one side collecting surface, by reversing the flow of the exhaust gas the accumulated particulates are oxidized by the active oxygen coming from this side and in addition, no further particulates are accumulated. Thus the active oxygen can gradually remove the accumulated particulates and by the next reversing time, a sufficient oxidization will be completed.

The switching timing of the valve body 71a is not necessarily made periodical. It may be switched every time the engine is decelerated. The determining of deceleration can be made by the driver's intention to decelerate vehicle such as release of the accelerator or depression of the brake pedal or a fuel cut operation.

Or it may be switched at the time when the accumulated particulates become a certain set amount. Assumption of the accumulation amount can be made according to the pressure difference between the direct upstream side and the direct downstream side of the filter 70. The pressure difference increases according to the increase of the accumulation of the particulates. It can also be defined by the electric resistance value on the partition wall of a predetermined particulate filter. The electric resistance value is decreased in accordance with the increase of the particulate accumulation. It can also use the light transmittance or reflection on the filter wall, which decreases in accordance with the increase of the accumulation of the particulates. Further, according to the graph in FIG. 24, the difference (M–G) is regarded as the accumulation amount of the particulates wherein, M is the discharged particulates amount assumed by the current engine operation condition and G is the possible oxidization amount considering the particulates temperature assumed by the current engine operation condition.

When the air-fuel ratio of the exhaust gas becomes rich, in other words, when the oxygen concentration in the exhaust gas is reduced, the active oxygen O is discharged outside at one time from the active oxygen release agent 61. By this active oxygen O discharged at one time the accumulated particulates become easy to be oxidized to be removed. On the other hand, when the air-fuel ratio is kept lean, the surface of the platinum Pt is covered by the oxygen that is a so-called oxygen toxicities. This will reduce the oxidization of the NOx and accordingly the NOx absorbing ratio is reduced to reduce the active oxygen releasing amount from the active oxygen release agent 61. However, when the air-fuel ratio is enriched, the oxygen on the surface of the platinum Pt is consumed to solve the oxygen toxicities. When the air-fuel ratio becomes lean again, the oxidization of the NOx is increased to increase the active oxygen discharging amount from the active oxygen release agent 61.

Accordingly, the oxygen toxicities of the platinum Pt can be resolved every time the air-fuel ratio is changed from lean to enrichment to accelerate the oxidization of the particulates on the filter 70 by the increase of the discharge amount of the active oxygen at the time of lean air-fuel ratio. Further, the resolving of the oxygen is combustion of the deoxidization substance and accordingly the temperature of the particulate filter 70 increases with heat generation. The oxygen removable particulates are increased on the filter and the oxygen of remaining and accumulated particulates on the filter are easily removable.

Immediately after the reversion of the exhaust gas upstream side and downstream side if the air-fuel ratio is enriched, the other collecting surface of the partition wall on which no particulates remain is easy to release the active oxygen compared to the one side surface and accordingly the remaining particulates on the one side surface can be surely oxidized due to the large amount of released active oxygen. It is also acceptable to enrich the air-fuel ratio of the exhaust gas independently of the switching operation of the valve body 71*a* not to generate the remaining or the accumulation of the particulates on the filter.

As a method for enriching the air-fuel ratio of the exhaust gas, the low temperature combustion can be conducted. It is also acceptable to simply enrich the combustion air-fuel ratio. In addition to the normal main fuel injection during the combustion stage, the fuel can be injected to the cylinder by the engine fuel injection valve during the exhaust or expansion stage (post-injection) or during the intake procedure. It is not necessarily to provide an interval between the main fuel injection and such post-injection or VIGOM injection. It is also possible to supply fuel in the engine exhaust system.

The particulate filter of the embodiment absorbs the NOx in the exhaust gas but the filter structure is a wall through type in which the exhaust gas passes through the fine holes of the collecting wall. Compared to the type that the exhaust gas passes along the partition wall carrying the catalyst, the distance between the collecting walls has to be large enough to pass through the exhaust gas of the same amount. The possibility of contacting with the active oxygen release agent carried on the collecting wall surface of the filter is smaller compared to the monolith type catalyst device. When the exhaust gas passes through the fine holes of the collecting wall, the exhaust gas contacts with the active oxygen release agent carried on the collecting surface wall, but mainly contacts only with the active oxygen release agent carried on the collecting surface. However, the catalyst carrying area of collecting wall surface is not so large. Accordingly, even if the active oxygen release agent absorbing the NOx is carried on the particulate filter, the NOx in the exhaust gas is not sufficiently purified.

Accordingly, the catalyst device 73 carrying the noble metal and the substance which is capable of using as the active oxygen release agent for catalyst of NOx deoxidization catalyst according to the embodiment is provided in the intermediate flow portion 71*c* of the central conduit member 71 to the position always at the downstream side of the particulate filter independently of the reversing operation of the upstream side and downstream side of the filter. The NOx, which has not been absorbed at the filter, can be absorbed to sufficiently decrease the discharge to the atmosphere. NOx catalyst carried by the catalyst device 73 is not limited to the NOx deoxidization catalyst but the other catalyst such as NOx selective deoxidization catalyst may be used for purifying NOx.

When the exhaust gas with a rich air-fuel ratio exhaust gas including the deoxidization substance flows into the particulates or the exhaust gas having a relatively large amount of HC and CO by conducting the low temperature combustion, flows into the particulate filter, not always all the deoxidization substances are oxidized by the noble metal of the filter or used for the NOx deoxidization discharged from the active oxygen release agent and therefore, the deoxidization substances passing through the filter have to be purified.

It is possible to purify the substances passing through the filter by the NOx deoxidization purification discharged from the noble metal catalyst when the NOx absorbing deoxidization catalyst is carried by the catalyst device 73, but it is possible to purify the substances passing through the filter when the catalyst device 73 carries at least the oxidization catalyst such as noble metal.

It is therefore, effective to provide a NOx catalyst device or oxidization catalyst device at the downstream side of the particulate filter to purify the harmful substances passing through the filter. If the catalyst device of the above type is provided at the upstream side of the filter, NOx and deoxidization substances are not sufficiently supplied to the particulate filter and the particulate oxidization removing function at the filter weakens. It is therefore important to provide the catalyst device at the downstream side. If simply providing the catalyst device at the downstream side, the purification of the harmful substances is not sufficiently achieved when the catalyst device is remote from the engine itself This is because the temperature increase of the catalyst device by the exhaust gas is insufficient and the catalyst is not sufficiently activated.

According to the catalyst device 73 of the embodiment, the device is always positioned at the downstream side of the filter 70 and close to the filter. Accordingly, by the oxidization removal of the particulates by the active oxygen at the filter and the combustion of the deoxidization substances by the noble metal, the particulate filter 70 is heated to transmit the heat from the filter to the catalyst device 73 to heat the catalyst device 73 thereby to sufficiently activate the catalyst.

Figure 28:
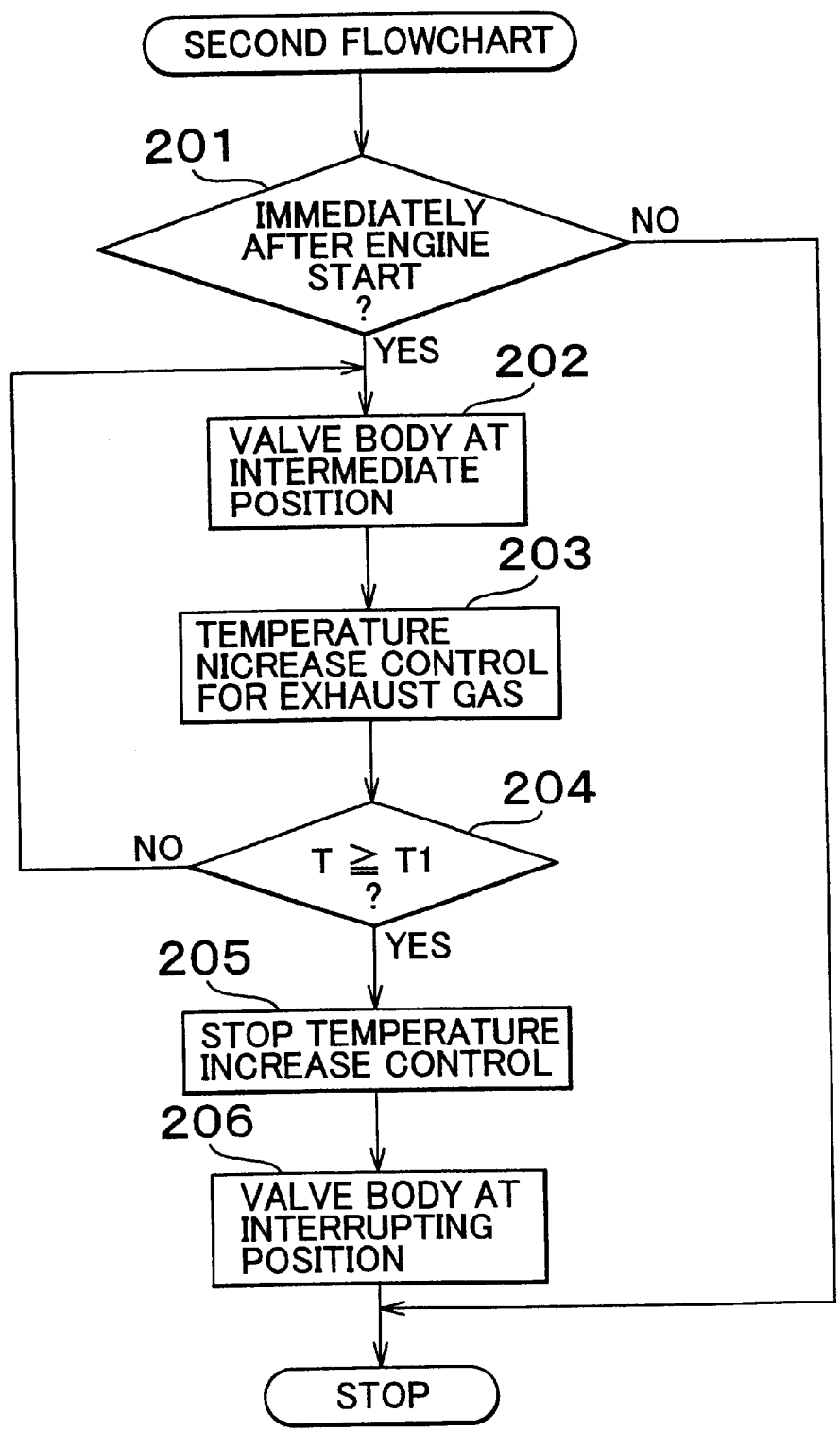
FIG. 28 shows a second flowchart for increasing the catalyst device temperature.

However, when the engine starts or immediately after the engine starts, the noble metal of the filter is not activated and the oxidization removal of the particulates and the combustion of the deoxidization substances are not sufficient. The filter cannot be heated early. Accordingly, it takes a long time to transmit the heat from the filter to the catalyst to heat up. During this time period, the harmful substances such as HC, CO, and NOx are discharged to the atmosphere. According to the embodiment, immediately after the engine is started, the catalyst device is warmed up at the early stage as shown in the flowchart in FIG. 28.

At step 201, it is determined whether the engine condition is immediately after the starting or not. If determined to be No, the process terminates here. If Yes, at step 202 the valve body 71*a* is positioned at the intermediate position. The exhaust gas directly flows into the catalyst device 73 bypassing the filter 70 not to be cooled and it is possible to warm up the catalyst device. At step 203, the exhaust gas itself is heated to increase the temperature. This temperature control is made by supplying fuel in the cylinder during the exhaust stage by post-injection to keep the combustion during the exhaust stage to heat the exhaust gas temperature.

The exhaust gas passing through the catalyst device 73 passes around the particulate filter 70 at the downstream portion 71*d* of the central conduit member 71 and the exhaust gas does not pass through the filter but the temperature of the filter is increased. At step 204, the temperature sensor 76 as the temperature of the catalyst device 73 detects the temperature of the exhaust gas at direct downstream side of the catalyst device 73 and it is determined whether the detected temperature T reaches the temperature T1 of the activation of the catalyst carried by the catalyst device 73. If determined Yes, the warm up of the catalyst device 73 is assumed to have been completed and at step 205, the temperature increase control of the exhaust gas is terminated. At step 206, the valve body 71a is set to be either of the two interrupting positions. It may also be possible to detect the exhaust gas temperature flowing into the catalyst device (the exhaust gas temperature at direct upstream side of the catalyst device) and the temperature of the catalyst device can be assumed based on this temperature. It is also possible to assume the temperature of the exhaust gas flowing into the catalyst device in accordance with the engine operation condition as the catalyst device.

The exhaust gas flows into the particulate filter only after the completion of the warm up of the catalyst device 73 to start the collection of the particulates. Before that, the particulates are exposed to the atmosphere.

The completion of the warm up of the catalyst device takes not so long and this can be neglected. Upon completion of the warm up, as described above, the temperature of the filter is increased to an extent and the amount of particulates for oxidization is improved. Thus the effective oxidization of the particulates is possible from the beginning of collection thereof.

Immediately after the engine starting, the temperature of the filter is low and oxidization of the particulates cannot be achieved efficiently at this stage. Under such condition, if the collection of the particulates begins, the particulates are accumulated on the filter to generate a clogging. It is preferable not to flow the exhaust gas into the filter immediately after the engine starting to prevent the clogging of the filter. Although the deoxidization substances are included in the exhaust gas for increasing the temperature of the filter and combusting by the noble metal catalyst of the filter, the catalyst device 73 functions sufficiently at the timing of flowing the exhaust gas into the filter to purify a part of the deoxidization substances passing through the filter.

Figure 29:
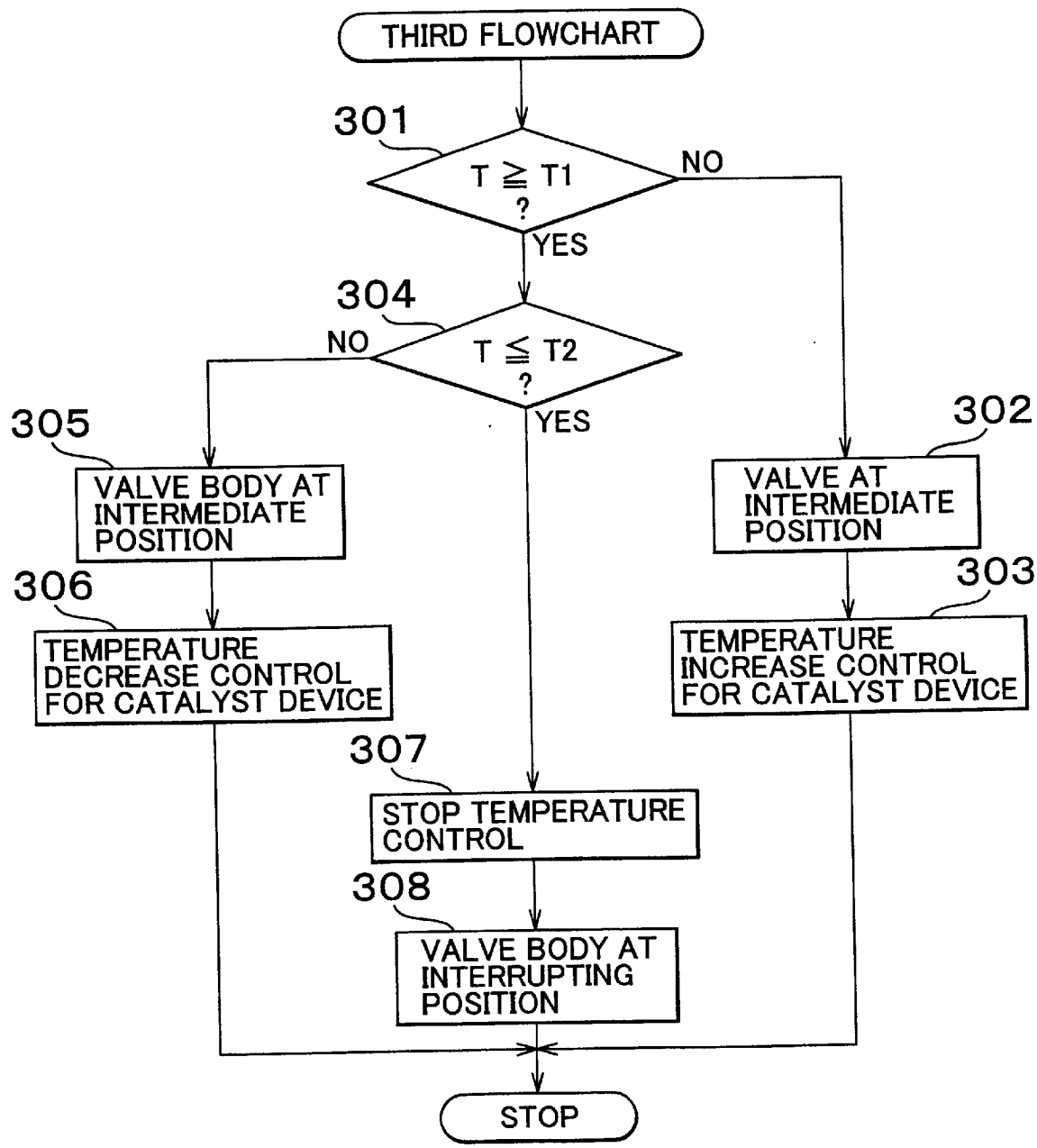
FIG. 29 shows a third flowchart for controlling the catalyst device temperature.

The NOx absorbing deoxidization catalyst cannot purify the NOx effectively when the catalyst temperature is too high or too low. The NOx absorbing deoxidization catalyst has an optimal temperature range of about 300° C. to 500° C. for effectively purifying NOx. When the catalyst device carries the NOx absorbing deoxidization catalyst, it is necessary to control the temperature thereof to the range described above. However, if simply the exhaust gas passing through the particulate filter 70 is introduced into the catalyst device, such control cannot be performed to decrease the purification function of the catalyst device. According to the embodiment, as shown in FIG. 29 the temperature of the catalyst device is controlled according to the flowchart shown in FIG. 29.

At step 301, the temperature sensor 76 detects the exhaust gas temperature T directly downstream of the catalyst device 73 as the catalyst temperature and it is determined whether the catalyst temperature T is equal to or more than the lower temperature limit T1 (300° C.). If determined to be No, at step 302 the valve body 71a is positioned at the intermediate position and the exhaust gas bypasses the filter and directly flows into the catalyst device. At the step 303, the temperature increase control for the catalyst device is conducted. This temperature control means to include relatively large amount of the deoxidization substances in the exhaust gas by any of the methods described above. The deoxidization substances are combusted by the noble metal catalyst carried by the catalyst device and this combustion heat increases the temperature of the catalyst device. Further, by continuing the combustion during the exhaust stage by post fuel injection, the temperature of the exhaust gas flowing into the catalyst device can be warmed up. Either way of temperature control, it is possible to effectively increase the temperature of the catalyst device since the exhaust gas is directly introduced into the catalyst device preventing the consumption of the deoxidization substances at the filter or cooling of the exhaust gas.

On the other hand, when the temperature T of the catalyst device exceeds the lower limit temperature T1, the determination at step 301 is Yes, and the program proceeds to step 304 to determine whether the temperature is lower than or equal to the upper limit temperature T2 (500° C.) or not. If determined No, at step 305, the valve body 71a is positioned at the intermediate position and the exhaust gas bypasses the filter to directly flow into the catalyst device. At step 306, the temperature deoxidization control for the catalyst device is conducted. The low temperature control means that the low combustion conducted at the lean air-fuel ratio or theoretical air-fuel ratio. The combustion temperature is decreased by the low temperature combustion to lower the exhaust gas temperature to decrease the temperature of the catalyst device.

When the air-fuel ratio is enriched at the low temperature combustion, the exhaust gas includes more deoxidization substances to increase the temperature. Lowering the exhaust gas by a fuel cut can also achieve the temperature decrease control. Although the fuel cut is difficult when the engine is under acceleration, no problems may occur under the driving conditions other than the acceleration even if an instant fuel cut is conducted. It is possible to decrease the temperature of the catalyst device by repetition of the instant fuel cutting operation. Waiting the engine deceleration, the valve body 71a is switched to the intermediate position and at the same time cutting fuel.

Under either temperature decrease controls, the exhaust gas is directly introduced into the catalyst device and it can effectively decrease the temperature of the catalyst device without heating the exhaust gas by removing the particulates at the filter by oxidization.

Regardless of the temperature control such as increase or decrease or by no temperature control, as far as the temperature of the catalyst device is within the set temperature range, the determinations at both steps 301 and 304 are Yes, and when the temperature control is conducted at step 307 this control is stopped and when the valve body 71a is positioned at the intermediate position at step 308, the exhaust gas is allowed to be passing through the filter by switching the valve body 71a to either of the interrupting positions. At step 308, when the valve body 71a is switched to the interrupting position from the intermediate position, the interrupting position is set to be the other interrupting position different from the one before the valve body 71a being at the intermediate position. This will reverse the upstream side and downstream side of the filter to prevent the logging of the filter as explained above.

When the catalyst carried by the catalyst device 73 as the NOx absorbing deoxidization catalyst includes the upper and lower temperature limits that function effectively, it is necessary to control the temperature increase and decrease controls, but when the oxidization catalyst is carried on the catalyst device, the temperature that functions effectively is only the lower limit and it is not necessary to control the temperature decrease at steps 304 and 306.

According to the embodiment, the catalyst device is located at the downstream side of the filter and the relatively large amount of the bulk of particulates separated from the filter flows into the catalyst device together with the exhaust gas and remains at the inlet of the catalyst device or within the catalyst device to increase the exhaust resistance of the catalyst device. According to the embodiment, the upstream side and downstream side of the filter is reversed and when the large amount of particulates are accumulated on the filter due to some reasons, the bulk of the particulates are easy to be separated from the filter. The separation of the particulates from the filter means that the particulates are removed from the filter to prevent the clogging of the filter. When the large amount of the accumulated particulates ignite for combustion at one time, the temperature of the filter may increase to become very high which might damage the filter by melting. It is therefore effective to avoid such risk.

Figure 30:
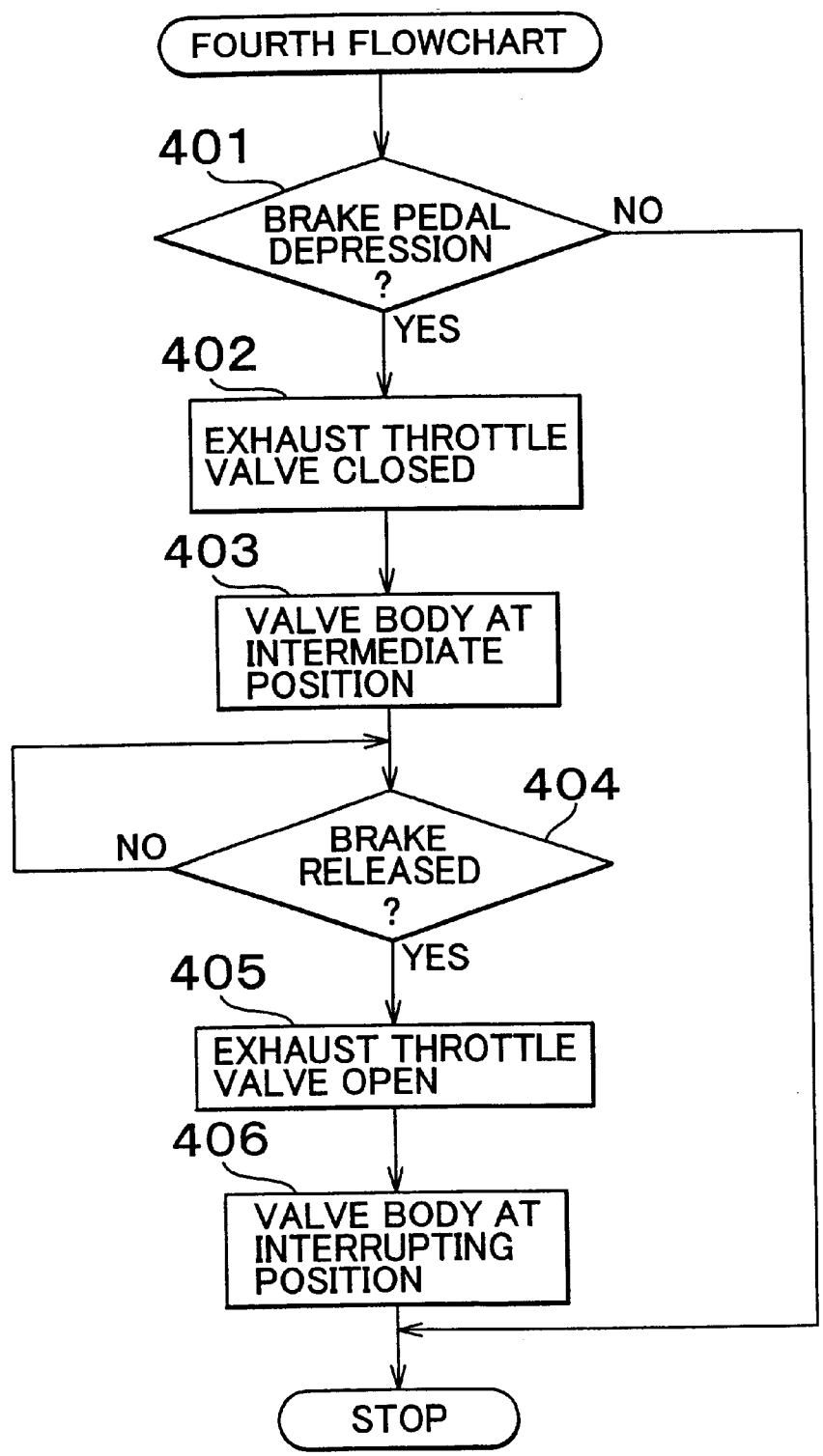
FIG. 30 shows a fourth flowchart for removing the bulk of particulates from the catalyst device.

However, it is not preferable that the accumulated particulates increase the exhaust gas resistance of the catalyst device since it may lead to the engine output deoxidization and this must be prevented. According to the embodiment, as shown in FIG. 30, the fourth flowchart prevents the remaining separated particulates from the catalyst. At step 401, it is determined whether the brake pedal is depressed by using a brake switch or the like. If determined No, the procedure terminates and if determined Yes, at step 402 the exhaust throttle valve 75 is opened to increase the exhaust gas resistance to generate the exhaust brake force. At step 403, the valve body 71a is positioned to the intermediate position. Normally when the brake pedal is depressed, the engine decelerates and combustion by the fuel cut operation is not conducted. Thus the particulates are not included in the exhaust gas and accordingly, the particulates are not discharged to the atmosphere even if the valve body 71a is positioned at the intermediate position and the exhaust gas bypasses the filter.

At step 404, it is determined whether the depressed brake pedal is released or not. This determination is repeated until the determination becomes Yes. When determined Yes, the exhaust throttle valve 75 is opened at step 405 assuming that the vehicle declaration is no more necessary. By this opening of the throttle valve, the exhaust gas the pressure of which has become very high at the upstream of the exhaust throttle valve, passes through the valve at one time. The flow rate of this exhaust gas is very high and is introduced into the catalyst device directly via the valve body 71a being at the intermediate position. Then the remaining bulk of the particulates in the catalyst device is destructed and discharged to the downstream side of the catalyst device. Thus it is possible to remove the bulk of particulates from the catalyst device. At step 406, the valve body 71a is switched to one of the interrupting positions from the intermediate position. At step 406, the interrupting position of the valve body 71a is preferably to the other interrupting position different from the one before the valve body 71a being at the intermediate position. Thus, the reversion of the upstream side and downstream side is made to prevent the clogging of the filter.

According to the embodiment, immediately before the exhaust throttle valve 75 being open, the valve body 71a has been positioned at the intermediate position to allow the high speed exhaust gas to flow directly into the catalyst device by bypassing the filter at the valve 75 opening. The high-speed exhaust gas flows into the catalyst device surely and prevents the bulk of particulates from separating from the filter. However, when the amount of the accumulated particulates have been already large, it is possible to use the high-speed exhaust gas for positively separating the particulates from the filter.

According to the embodiment, the exhaust throttle valve is positioned at the upstream side of the catalyst device, it is not limited to that position and may be positioned at the downstream side of the catalyst device. According to this position of the exhaust throttle valve, the exhaust gas flowing slowly in the catalyst device can flows with a high speed in the catalyst device by the closing of the exhaust throttle valve to remove the bulk of the particulates from the catalyst device as mentioned above. As stated above, when the NOx absorbing deoxidization catalyst is carried by the catalyst device 73, it is necessary to decrease the catalyst device temperature below the upper temperature limit value but when the catalyst device 73 is located downstream of the filter 70, practically the temperature of the catalyst device rarely increases beyond the upper limit value and in order to keep the temperature of the catalyst device to be more than the lower limit value, it is necessary to increase the temperature as much as possible. When the oxidization catalyst is carried on the catalyst device 73, in this case the upper temperature limit does not exist it is necessary to increase the temperature as much as possible.

Figure 31:
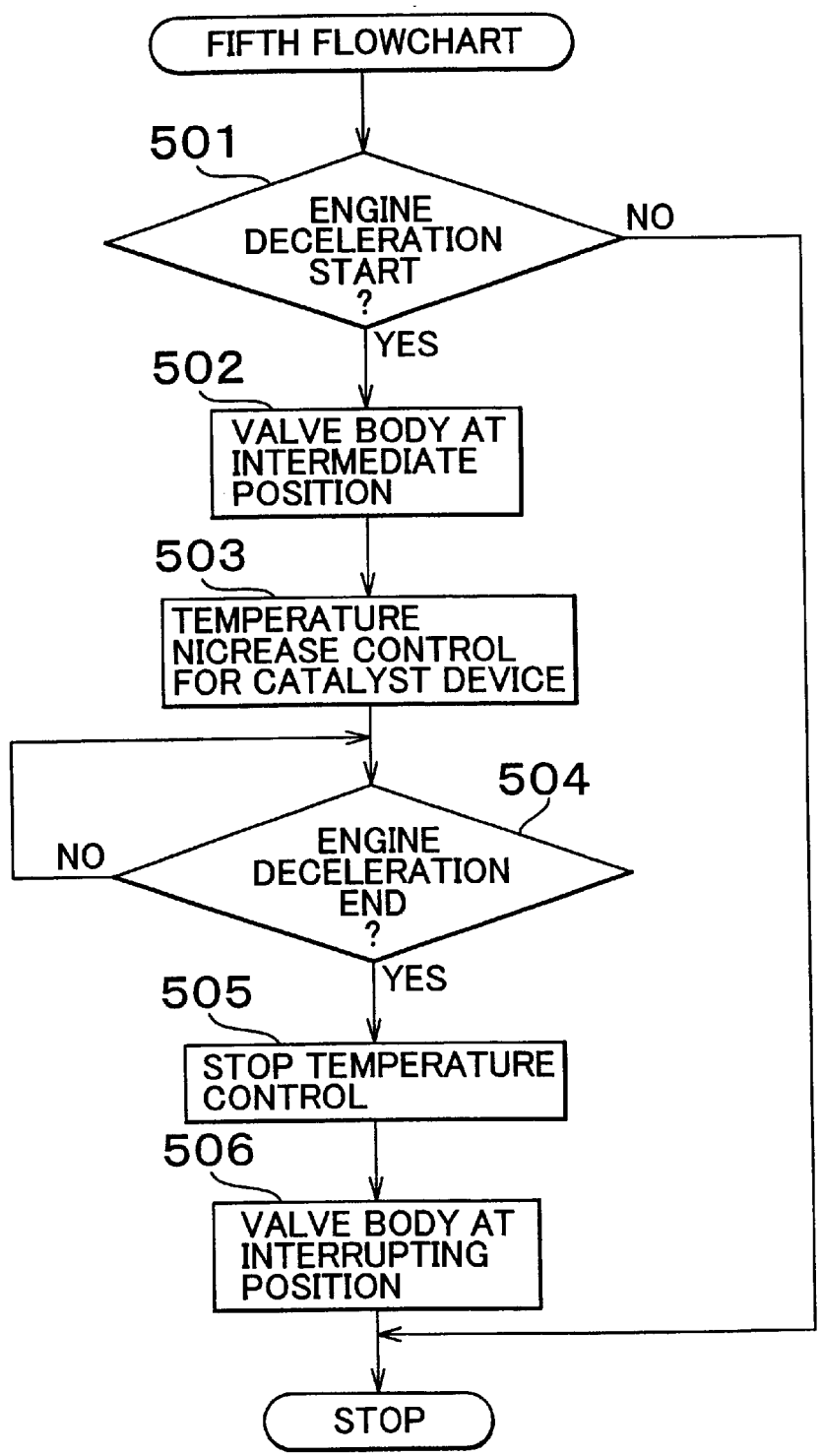
FIG. 31 is a fifth flowchart for temperature increase controlling of the catalyst device.

FIG. 31 shows the fifth flowchart in which at step 501, it is determined whether the engine is decelerated or not. Detecting the depression of the acceleration pedal or the release of the pedal makes this determination. If determined No, the procedure terminates and if determined Yes, at step 502, the valve body 71a is positioned to the intermediate position and the exhaust gas flows directly into the catalyst device by-passing the filter. At step 503, the temperature increase control is made.

This temperature increase control is as is the same with the third flowchart the deoxidization substances in the exhaust gas are included as much as possible. The deoxidization substances are combusted by the noble metal, which is carried by the catalyst device, and it is possible to increase the temperature by the combustion heat generated thereby. Under the engine deceleration, when no fuel cut is made to keep the combustion, the temperature increase control is made by post fuel injection to increase the exhaust gas temperature at the exhaust stage. Either way of temperature control, it is possible to effectively increase the temperature of the catalyst device since the exhaust gas is directly introduced into the catalyst device preventing the consumption of the deoxidization substances at the filter or cooling of the exhaust gas.

At step 504, it is determined whether the deceleration of the engine is terminated or not. This determination is repeated until the determination becomes Yes to continue the temperature increase operation. When determined Yes, at step 504, at step 505 the temperature increase control is stopped and at step 506, the interrupting position of the valve body 71a is preferably to the other interrupting position different from the one before the valve body 71a being at the intermediate position.

Under the temperature increase control of the catalyst device by the deoxidization substances, a part of the deoxidization substances may be discharged to the atmosphere passing through the catalyst device and under the temperature increase control by post fuel injection, the fuel consumption is increased and accordingly it is not preferable to conduct unnecessarily frequently. When the temperature of the catalyst device is predicted to be sufficiently high by the high load operation immediately before the deceleration of the engine, the valve body 71a is not shifted to the intermediate position even when the engine become deceleration condition and further, the temperature increase control is not recommended under this case. There is no meaning unless the noble metal is not activated under the deoxidization substance temperature increase control and therefore, assuming that the noble metal is inactivated immediately after the engine starting, it is not preferable to conduct the temperature increase control by the deoxidization substances. It is possible to conduct the temperature increase operation by post fuel injection even the noble metal catalyst is inactive.

In the presence of $SO_3$, in the calcium Ca in the exhaust gas, the calcium produces calcium sulfate $CaSO_4$. Calcium sulfate $CaSO_4$ is difficult to be oxidized and remains on the filter as an ash. Accordingly in order to prevent the clogging of filter by the calcium sulfate $CaSO_4$ an alkaline metal or an alkaline earth metal that is higher in ionization tendency than calcium Ca, such as kalium K, is used as the active oxygen release agent 61, the $SO_3$ diffused into the active oxygen release agent 61 is coupled with kalium K and forms kalium sulfate $K_2SO_4$, and calcium Ca passes through the partitions of the particulate filter 70 without being coupled with $SO_3$ and flows through the partition wall of the filter. Thus, the particulate filter 70 is prevented from being clogged. Thus, as described above, it is desired that an alkaline metal or an alkaline earth metal that is higher in ionization tendency than calcium Ca, namely, kalium K, lithium Li, cesium Cs, rubidium Rb, barium Ba or strontium Sr be used as the active oxygen release agent 61.

Further, the invention is also applicable to a case where only a noble metal such as platinum Pt is carried on the carrier layers formed on the front and back surfaces of the particulate filter 70. Note that a solid line indicating the amount G of the particulates that can be eliminated through oxidization is slightly offset to the right of the solid line shown in FIG. 24. In this case, active oxygen is released from the $NO_2$ or $SO_3$ retained on the surface of platinum Pt. Further, a cerium Ce is used as an active oxygen release agent. The cerium Ce absorbs oxygen when the oxygen concentration in the exhaust gas is high ($Ce_2O_2 \rightarrow 2CeO_2$) and if the concentration of the oxygen decreases, the active oxygen is discharged ($2Ce_2O_2 \rightarrow Ce_2O_3$). In order to remove the oxygen from the particulates the air-fuel ratio of the exhaust gas is enriched periodically or non-periodically. Instead of using cerium Ce, Fe or Sn may be used.

As the active oxygen release agent, the NOx absorbing deoxidization catalyst may be used for purifying NOx in the exhaust gas. In this case, the air-fuel ratio of the exhaust gas is necessary to be temporarily enriched for discharging the NOx or SOx.

According to the embodiment, the particulate filter itself carries the active oxygen release agent to oxidize the particulates by the active oxygen released from the active oxygen release agent, but it is not limited to such structure. For example, the particulate oxidization component such as active oxygen and $CO_2$ which functions equal to the active oxygen may be discharged from the filter or the substance carried thereon or may flow into the particulate filter from outside. In case of particulate oxidization component being flowing into the filter from outside, in order to collect the particulates the first collecting surface and second collecting surface of the collecting wall are alternately used wherein the one collecting surface which becomes the downstream side has no accumulation of further newly flown particulates and the accumulated particulates are gradually oxidized to be removed by the particulate oxidization component flown from the other side collecting surface to sufficiently remove the accumulated particulates taking a time to a certain extent. During this time, the other collecting surface collects the particulates and oxidizes by the oxidization component of the particulates. This can achieve the same effects as above.

The diesel engine according to the embodiment conducts the lower temperature combustion and higher temperature combustion by switching them, but the invention is not limited to this method and diesel engine conducting only the normal combustion is acceptable or the gasoline engine discharging the particulates may be applicable to this invention.

Figure 32:
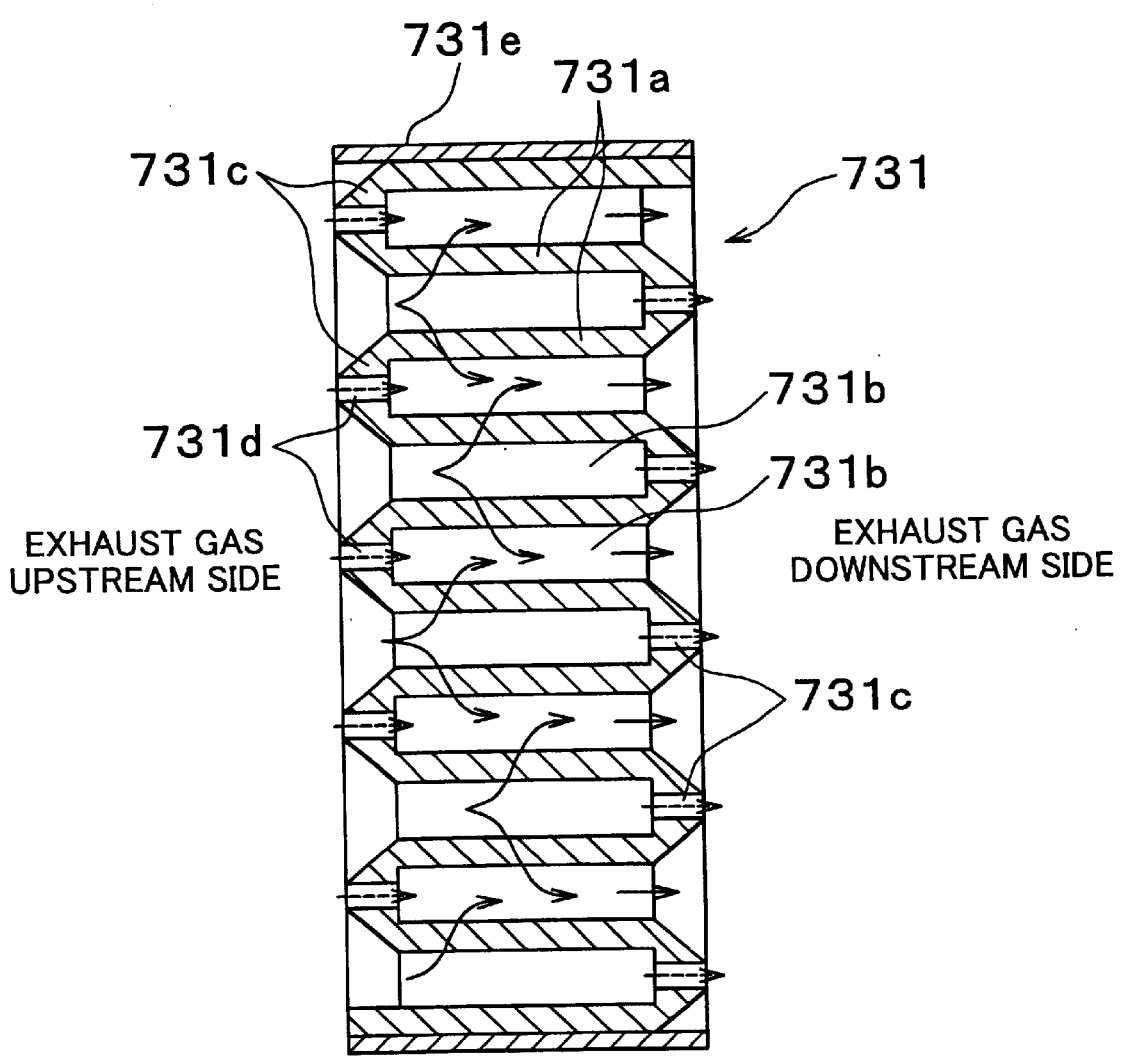
FIG. 32 is a side cross sectional view of the catalyst device capable of collecting the particulates.

The catalyst device 73 as described is of a normal monolith type but the catalyst device 731 of type having a cross section as shown in FIG. 32 may be used. The catalyst device 731 shown in FIG. 32 includes a plurality of partition walls 731a extending in axial direction and formed by porous materials such as cordierite as same with the particulate filter 70 in the outer frame 731e. The inside of the catalyst device 731 is divided into a plurality of spaces by each partition wall 731a.

One partition wall 731a surrounding one of the two adjacent axial spaces 731b forms a tapered portion 731c tapered toward outside at exhaust gas upstream side and the other partition wall 731a surrounding the other of the two adjacent spaces 731b forms another tapered portion 731c tapered toward outside at exhaust gas downstream side. Each tapered portion 731c is in quadratic conic shape when the axial space 731b is rectangular in cross section and the conical shape of the tapered portion 731c is variable depending on the shape of the axial space 731c in cross section. The opening area of the axial space 731b surrounded by the tapered portion 731c at the upstream side of the exhaust gas is far larger than the cross section area (at central portion) of the axial space 731c. The tapered portion 731c can be formed by deforming one end of the partition wall 731a.

The tapered portions 731c at both upstream and downstream sides of the exhaust gas do not close the respective corresponding axial spaces 731b and each has a passage 731d which has a smaller area in cross section than the cross section area of the corresponding axial space 731. The exhaust gas flowing into the catalyst device 731 flows into about half of the axial spaces 731b having tapered portions 731c at the upstream side of the exhaust gas via a passage 731d having a smaller cross section area as shown with the dashed arrow line. The exhaust gas flowing into the catalyst device 731 flows into the other half of the axial spaces 731b without tapered portions 731c at the upstream side of the exhaust gas via a large opening and in total the exhaust gas flow resistance is not so different in value from the monolith type catalyst device.

The part of the exhaust gas flowing into the corresponding axial space 731b via the large opening flows out via the passage 731d of the tapered portion 731c as shown with the dashed arrow line since the axial space 731b includes the tapered portion 731c at the downstream side of the exhaust gas. However, main flow of the exhaust gas passes through the partition wall 731a surrounding the axial space 731b and flows out from the adjacent axial space 731b. Thus the total flow resistance of the exhaust gas is not so different in value from the monolith type catalyst. The exhaust gas easily passes through the catalyst device 731.

Each partition wall 731a carries the NOx absorbing deoxidization catalyst, NOx selective deoxidization catalyst or the oxidization catalyst as similar to the catalyst device 73. Thus similar to the catalyst device 73, the catalyst device 731 the catalyst device 731 can purify the harmful substances such as NOx or deoxidization substances in the exhaust gas passing through the particulate filter 70 before they are discharged to the atmosphere. As mentioned previously, the since the catalyst device 731 is structured to have the partition walls 731a, through each of which the exhaust gas passes, the particulates can be collected by the partition walls as is the same with the particulate filter 70. For example, when the engine starts and the valve body 71a is positioned at the intermediate position, or during the valve switching operation, the exhaust gas containing the particulates bypasses the filter 70. The particulates are collected by the catalyst device 731 and are not discharged to the atmosphere.

Thus collected particulates are removed by oxidization by the noble metal catalyst same as the particulate filter 70 and the active oxygen discharged from the substances which are the substances that are usable as the active oxygen release agent carried by the catalyst device 731 as the NOx absorbing deoxidization catalyst. Thus no accumulation of the particulates at the partition walls 731a of the catalyst device 731. In case that the noble metal such as platinum Pt is carried by the catalyst device 731 as the oxidization catalyst, the active oxygen can be released to prevent the accumulation of the particulates on the partition walls 731.

The catalyst device 731 receives only the particulates in the exhaust gas that bypass the filter 70 and the particulates that cannot be collected and the possibility that the particulates are collected by the catalyst device 731 beyond the oxidization removable particulates of the catalyst device 731 is small based on the method similar to the particulate filter 70.

If by any reason, relatively larger amount particulates are accumulated on the partition walls 731a of the catalyst device 731, since the catalyst carried by the partition walls 731a of the catalyst device 731 are not discharging the active oxygen and even the relatively large amount of particulates are accumulated on the partition walls 731a due to long use, the exhaust gas flows into the corresponding space 731b of the tapered portion 731c at the upstream side of the exhaust gas even if the exhaust gas cannot pass through each partition wall 731a due to the accumulation of the particulates since the catalyst device 731 is provided with the passage 731d at the tapered portion 731c and then flows out from the corresponding axial space 731b. Further the exhaust gas flows into the large opening adjacent to each tapered portion 731c at the exhaust gas upstream side and flows out from the passage 731d of the tapered portion 731c at the exhaust gas downstream side.

Thus, even when the large amount of particulates is accumulated on each partition wall 731a, the vehicle operation is prevented from its malfunction by restricting the increase of the flow resistance of the catalyst device 731.

The exhaust gas at this time, contacts with the catalyst carried on the surface of the partition walls 731a upon passing through the catalyst device 731 to purify the harmful substances such as HC, CO and NOx in the exhaust gas corresponding the carried catalyst.

Figure 33:
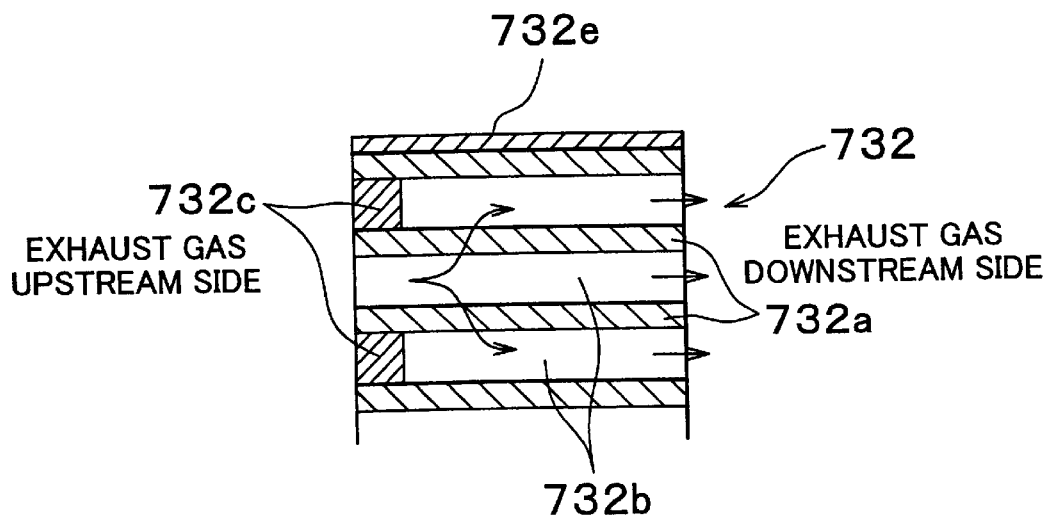
FIG. 33 is a side sectional view of a first modified embodiment of the catalyst device of FIG. 32.

FIG. 33 is a cross sectional view showing a first modification of the catalyst device 731 explained in FIG. 32. Only the difference from the catalyst device 731 will be explained hereinafter.

According to a catalyst device 732 of this modification, a plug 732c is provided instead of the tapered portion 732b at the exhaust gas upstream side and the corresponding axial space 732b is closed by the plug 732c at the upstream side of the exhaust gas. The tapered portion at the downstream side of the exhaust gas is omitted. Outer frame 732e is a partition wall made from the porous material.

According to the catalyst device 732, the exhaust gas is surrounded by the axial space 732b closed by the plug 732c and flows into the axial space, which is not provided with the plug 732c. A part of the exhaust gas flows out from the axial space 732b but other part of the exhaust gas flows out from another axial space 732b adjacent to this axial space 732b passing through the partition wall 732a.

The particulates in the exhaust gas passing through the partition wall 732a are collected by the wall 732a. The collected particulates by the partition wall 732a is as same with the catalyst device in FIG. 32 is oxidized to be removed by the active oxygen discharged from the catalyst carried by the partition wall 732a. Even if a large amount of the particulates are accumulated on the partition wall 732a, the exhaust gas flows into the axial space 732b, which is not provided with the plug 732c and flows out from the axial space 732b to prevent the malfunction of vehicle operation caused by the unusual large flow resistance of the catalyst 732a.

The exhaust gas at this time, contacts with the catalyst carried on the surface of the partition walls 732a upon passing through the catalyst device 732 to purify the harmful substances such as HC, CO and NOx in the exhaust gas corresponding the carried catalyst.

Figure 34:
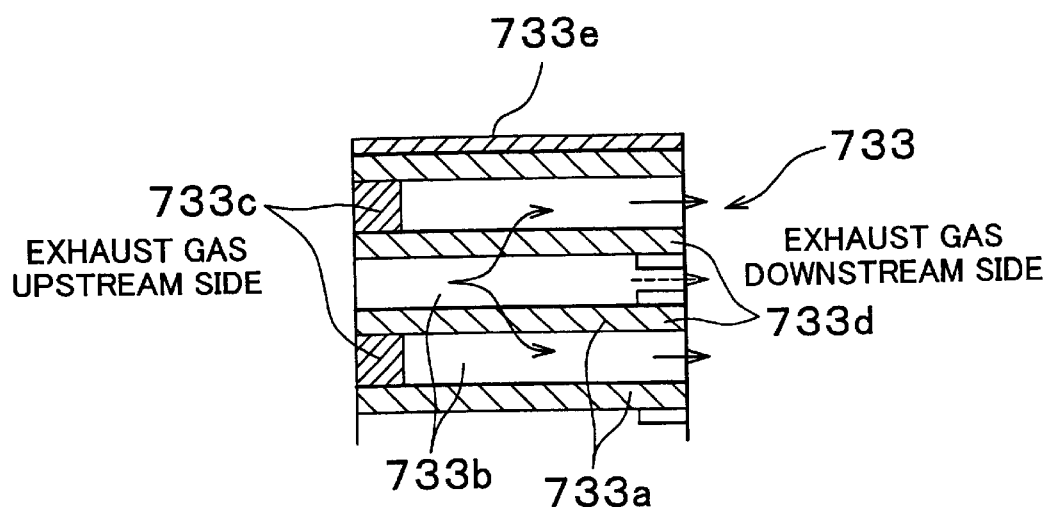
FIG. 34 is a side sectional view of a second modified embodiment of the catalyst device of FIG. 32.

FIG. 34 is a cross sectional view showing a second modification of the catalyst device 731 explained in FIG. 32. Only the difference from the catalyst device 731 will be explained hereinafter.

According to a catalyst device 733 of this modification, an axial space 733b, which is not provided with a plug 733c at the exhaust gas upstream side, the catalyst coating layer 733d (for example alumina) for carrying the catalyst on the partition wall 733a is thickened only at the downstream side of the exhaust gas. By this thickened catalyst layer 733d, the cross section area of the axial space 733b without plug 733c is throttled to restrict the flowing of the exhaust gas from the axial space 733b.

Compared to the first modification, in this modification, for the amount of the exhaust gas flowing into the axial space 733b which is not provided with the plug 733c, the amount of flowing out from the axial space 733b as shown with the dashed arrow line is reduced and the amount of flowing out from the axial space adjacent to the axial space 733b passing through the partition wall 733a as shown with the solid arrow line is increased.

The flow of the exhaust gas indicated with the dashed arrow line cannot collect the particulates in the exhaust gas but by reducing the flow amount directly passing through the axial space 733b, most of the particulates in the exhaust gas flowing into the catalyst device 733 can be collected by the partition walls 733a.

Even if a large amount of the particulates are accumulated on the partition wall 733a, the exhaust gas flows into the axial space 733b that is not provided with the plug 733c and flows out from the axial space 733b to prevent the malfunction of vehicle operation caused by the unusual large flow resistance of the catalyst 733a.

The exhaust gas at this time, contacts with the catalyst carried on the surface of the partition walls 733a upon passing through the catalyst device 733 to purify the harmful substances such as HC, CO and NOx in the exhaust gas corresponding the carried catalyst.

Figure 35:
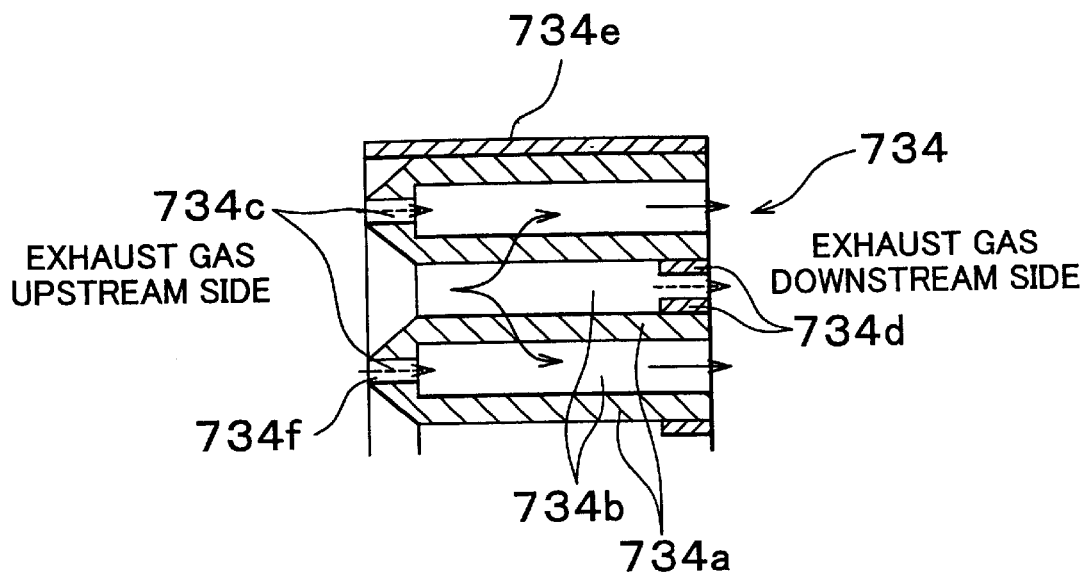
FIG. 35 is a side sectional view of a third modified embodiment of the catalyst device of FIG. 32.

FIG. 35 is a cross sectional view showing a third modification of the catalyst device 731 explained in FIG. 32. Only the difference from the catalyst device 731 will be explained hereinafter.

According to a catalyst device 734 of this modification, instead of using the tapered portion at the downstream side of the exhaust gas, a thick catalyst layer 734d is provided as similar to the second modification.

The same effects can be achieved by this modification as the catalyst device 731 in FIG. 32. Since it is easier to provide the thick catalyst layer 734d rather than providing the passage 734f by forming a tapered portion 734c by the partition wall 734a, the catalyst device 734 is easy to be manufactured compared to the catalyst device 731 of FIG. 32. The catalyst device 734 of this modification is further easier to be manufactured by substituting the tapered portion 734c and the passage 734f at the upstream side of the exhaust gas for as same with the downstream side the thick catalyst layer.

Figure 36:
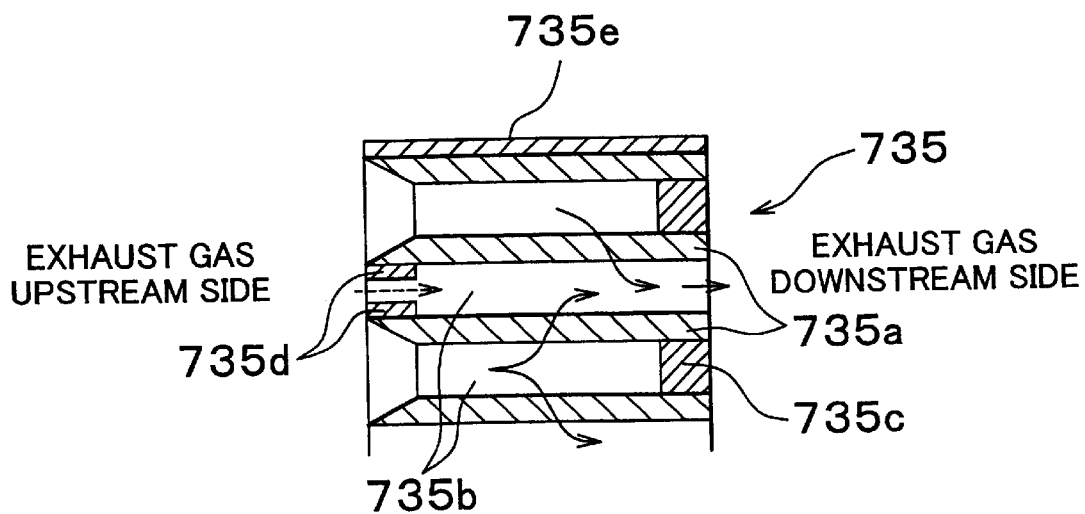
FIG. 36 is a side sectional view of a fourth modified embodiment of the catalyst device of FIG. 32.

FIG. 36 is a cross sectional view showing a fourth modification of the catalyst device 731 explained in FIG. 32. Only the difference from the catalyst device 731 will be explained hereinafter.

According to a catalyst device 735 of this modification, instead of providing the plug at the downstream side of the exhaust gas, a plug 735c is provided at the downstream side of the exhaust gas and instead of providing the thick catalyst layer at the downstream side of the exhaust gas, a thick catalyst layer 735d is provided at the upstream side of the exhaust gas.

At the upstream side of the exhaust gas of the axial space 735b closed by the plug 735c at the downstream side of the exhaust gas, the partition wall 735a surrounding the axial space 735b is chamfered to make the opening of the axial space large at the upstream side of the exhaust gas. Accordingly, the exhaust gas is easy to be flown into the axial space 735b.

According to this structure, the exhaust gas flowing into the catalyst device 735b flows into the about half of the axial spaces 735b each having a large opening at the upstream side of the exhaust gas and as shown with the dashed line, the exhaust gas flows into the other half of the axial spaces 735b throttled by the thick catalyst layer 735d at the upstream side of the exhaust gas.

Further, the axial spaces 735b having the large opening are closed by the plug 735c at the downstream side of the exhaust gas and the exhaust gas flown into the axial spaces 735b flow out of the adjacent spaces 735b by passing through the partition walls 735a surrounding the axial spaces 735b as shown with the solid arrow line.

Thus, most of the exhaust gas flowing into the catalyst device 735 passes through the partition walls 735b to effectively collect the particulates in the exhaust gas by the partition walls 735b.

The particulates collected by the partition walls 735a as the catalyst device in FIG. 32, are removed by the oxidization by the active oxygen released from the catalyst carried by the partition walls 735a.

Even if a large amount of the particulates are accumulated on the partition wall 735a, the exhaust gas flows into the axial space 735b which is not provided with the plug 735c and flows out from the axial space 735b to prevent the malfunction of vehicle operation caused by the unusual large flow resistance of the catalyst device 735.

The exhaust gas at this time, contacts with the catalyst carried on the surface of the partition walls 735a upon passing through the catalyst device 735 to purify the harmful substances such as HC, CO and NOx in the exhaust gas corresponding the carried catalyst.

Figure 37:
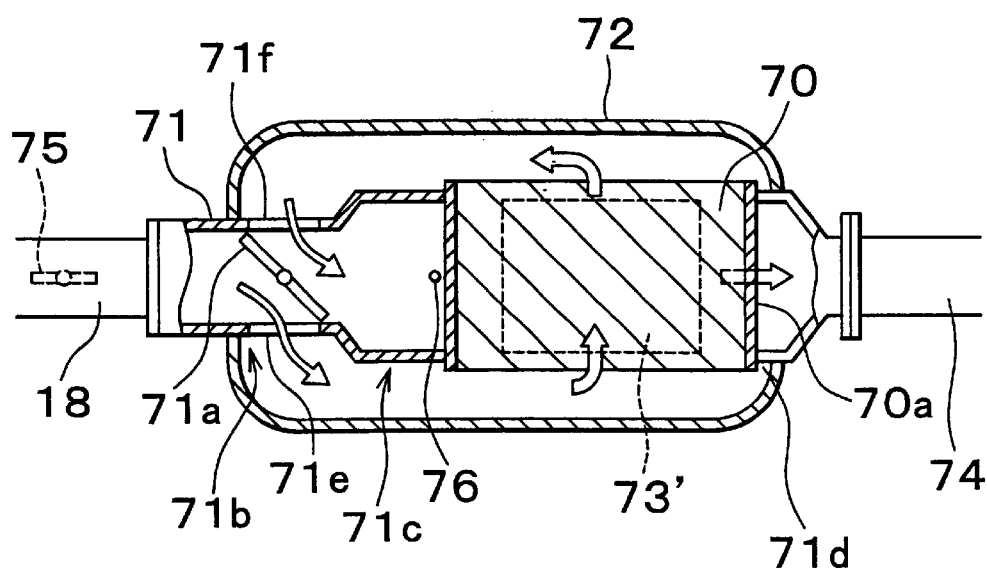
FIG. 37 is a cross sectional view of another embodiment of the exhaust gas purifier according to the invention.
Figure 38:
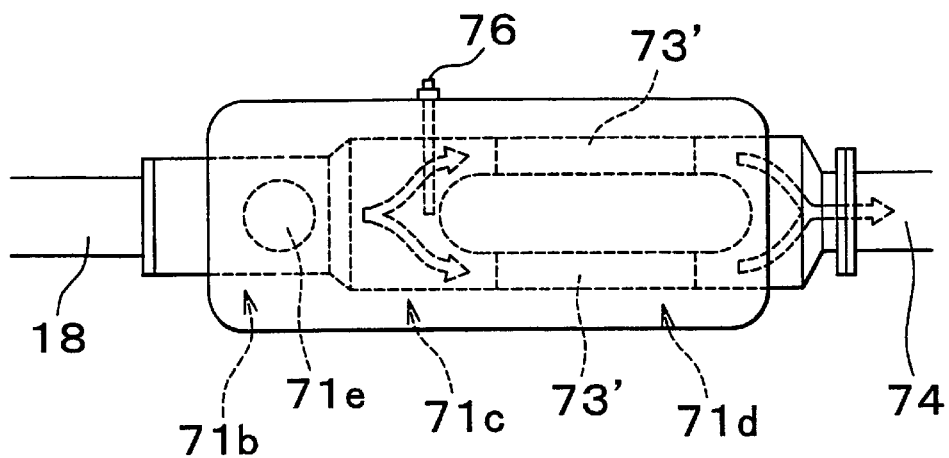
FIG. 38 is a side view of the exhaust gas purifier shown in FIG. 37.

FIG. 37 is a plane view showing another embodiment of the exhaust gas purifier and FIG. 38 shows a side view of the purifier of FIG. 37. The difference with the purifiers shown in FIGS. 18 and 19 is the position of the catalyst device 73'.

According to a catalyst device 73' of this embodiment, the catalyst device 73' is positioned around the outer case 70a of the particulate filter 70 within the downstream portion 71d of the central conduit member 71. The shape of the cross section of the catalyst device 73' is the shape which removes a rectangular cross sectional shape of the central outer case 70a from the circular cross sectional shape when the downstream portion 71d is circular in cross section. Thus the catalyst device 73' is located more closer to the particulate filter 70 compared to the one in the exhaust gas purifier described in the previous embodiment.

Accordingly sufficient heat transfer is achieved from the particulate filter 70 to the catalyst device 73' when the temperature of the filter 70 is increased by the oxidization of the particulates by the active oxygen and the combustion of the deoxidization substances by the noble metal catalyst to increase the temperature of the catalyst device 73' for sufficient activation of the catalyst.

The discharged heat via the outer case 70a of the filter 70 can be used mainly for heating the catalyst device 73' by the position of the catalyst device 73'.

When the temperature of the catalyst device 73' is increased, the discharged heat amount from the particulate filter 70 can be reduced, which means that the particulates for oxidation removal of the filter 70 can be increased by keeping the high temperature of When the temperature of the catalyst device 73' is higher than the temperature of the filter 70 by the generated heat upon the purification of the exhaust gas, the effective heat transfer from the catalyst device 73' to the filter can be achieved in reverse to increase the particulates for oxidization removal by heating the particulate filter 70. It is true that the catalyst device 73 of the previous embodiment can raise the temperature of the filter 70 by the heat transfer when the temperature is sufficiently increased. The catalyst device 73' can carry the catalyst which is same as the catalyst carried by the catalyst device 73 and the monolith type carriers or the carriers shown in FIGS. 32 to 36 can be also applicable.

What is claimed is:

1. An exhaust gas purifier, comprising:
   a particulate filter disposed in an engine exhaust system for collecting particulates;
   a reversing device that reverses an exhaust upstream side and an exhaust downstream side of the particulate filter; and
   a catalyst device arranged adjacent to the particulate filter at a position always being at the exhaust gas downstream side of the particulate filter,
   wherein the collected particulates at the particulate filter are oxidized, the particulate filter includes a collecting wall for collecting the particulates, the collecting wall has a first collecting surface and a second collecting surface, and wherein the first and the second collecting surfaces are alternately used for collecting particulates by reversing the exhaust gas upstream side and the exhaust gas downstream side of the particulate filter by the reversing device.

2. The exhaust gas purifier according to claim 1, wherein an active oxygen release agent is carried by the collecting wall, and an active oxygen released from the active oxygen release agent oxidizes the particulates.

3. The exhaust gas purifier according to claim 2, wherein the active oxygen release agent collects and retains the oxygen when an excess oxygen exists around the active oxygen release agent, and wherein the active oxygen release agent releases the retained oxygen as an active oxygen when an oxygen concentration around the active oxygen release agent is decreased.

4. The exhaust gas purifier according to claim 1, wherein the catalyst device carries an oxidization catalyst.

5. The exhaust gas purifier according to claim 1, wherein the catalyst device carries a NOx catalyst.

6. The exhaust gas purifier according to claim 1, wherein the reversing device includes a valve body, and reverses the exhaust gas upstream side and the exhaust gas downstream side of the particulate filter by switching the valve body from a first position to a second position, and wherein the exhaust gas flows into the catalyst device directly without passing through the particulate filter when the valve body is switched to an intermediate position between the first and second positions.

7. The exhaust gas purifier according to claim 6, wherein the valve body is positioned at the intermediate position immediately after the engine starts.

8. The exhaust gas purifier according to claim 6, wherein the exhaust gas purifier further includes a temperature detecting device that detects or assumes a temperature of the catalyst device, and wherein the exhaust gas condition is changed to be within a predetermined temperature range when the detected or assumed temperature of the catalyst device by the temperature detecting device is deviated from the predetermined temperature range by positioning the valve body to the intermediate position.

9. The exhaust gas purifier according to claim 6, wherein an exhaust throttle valve is provided in the engine exhaust system, and the valve body is positioned to the intermediate position immediately before the exhaust throttle vlave opens.

10. The exhaust gas purifier according to claim 6, wherein when the engine in decelerated, the valve body is positioned at the intermediate position and at least the exhaust gas temperature is increased or the amount of deoxidization substances in the exhaust gas is increased.

11. The exhaust gas purifier according to claim 1, wherein the reversing device includes a valve body, and reverses the exhaust gas upstream side and the exhaust gas downstream side of the particulate filter by switching the valve body from a first position to a second position, and wherein the catalyst device is arranged adjacent to a downstream of the valve body.

12. The exhaust gas purifier according to claim 1, wherein the catalyst device is arranged closer to the internal combustion engine than the particulate filter, and wherein the catalyst device is connected to the particulate filter so that the exhaust gas that flows out the particulate filter flows into the catalyst device.

13. The exhaust gas purifier according to claim 1, wherein the catalyst device includes:
   a partition wall formed by porous material and divides the inside of the catalyst device into a plurality of axial spaces; and
   a flow amount control portion that is arranged at at least one of an upstream end and an downstream end of the axial space and controls a flow amount of the exhaust gas.

14. The exhaust gas purifier according to claim 13, wherein the flow amount control portion is arranged at the upstream end of the partition wall which surrounds one of two adjacent axial spaces.

15. The exhaust gas purifier according to claim 13, wherein the flow amount control portion is arranged at the downstream end of the partition wall which surrounds one of two adjacent axial spaces.

16. The exhaust gas purifier according to claim 13, wherein the flow amount control portion is a plug which is arranged at one of the upstream side and the downstream side of each axial space and prevents the exhaust gas from flowing.

17. The exhaust gas purifier according to claim 13, wherein the flow amount control portion is a tapered portion which enlarges or reduces an opening area of the axial space.

18. The exhaust gas purifier according to claim 17, wherein the tapered portion is provided with a passage which has a cross section area smaller than a cross section area of the axial space.

19. The exhaust gas purifier according to claim 17, wherein the tapered portion is formed by deformation of the partition wall.

20. The exhaust gas purifier according to claim 13, wherein the flow amount control portion is a catalyst coating layer that carries a catalyst on the partition wall.

21. The exhaust gas purifier according to claim 1, wherein both of the particulate filter and the catalyst device are arranged in one housing.

22. The exhaust gas purifier according to claim 1, wherein the catalyst device is positioned around the particulate filter.

* * * * *